United States Patent
Tsuchida et al.

(10) Patent No.: US 7,680,878 B2
(45) Date of Patent: Mar. 16, 2010

(54) APPARATUS, METHOD AND COMPUTER SOFTWARE PRODUCTS FOR CONTROLLING A HOME TERMINAL

(75) Inventors: Shinichi Tsuchida, Ibaraki (JP);
Yasuyuki Shintani, Nishinomiya (JP);
Kazuhiro Aizu, Neyagawa (JP);
Hideaki Takechi, Toyonaka (JP);
Toshiki Yamamura, Suita (JP); Naonori Kato, Hirakata (JP)

(73) Assignee: Panasonic Corporation, Osaka (JP)

( * ) Notice: Subject to any disclaimer, the term of this patent is extended or adjusted under 35 U.S.C. 154(b) by 366 days.

(21) Appl. No.: 10/524,589

(22) PCT Filed: Sep. 22, 2003

(86) PCT No.: PCT/JP03/12054

§ 371 (c)(1),
(2), (4) Date: Feb. 15, 2005

(87) PCT Pub. No.: WO2004/032452

PCT Pub. Date: Apr. 15, 2004

(65) Prior Publication Data

US 2006/0155984 A1    Jul. 13, 2006

(30) Foreign Application Priority Data

Sep. 30, 2002   (JP) ............................. 2002-286753

(51) Int. Cl.
*G06F 15/173* (2006.01)
(52) U.S. Cl. ........................ 709/203; 709/218; 709/238
(58) Field of Classification Search ................. 709/225, 709/203, 218, 219, 220; 370/485

See application file for complete search history.

(56) References Cited

U.S. PATENT DOCUMENTS 6,373,841 B1 * 4/2002 Goh et al. .................... 370/389

(Continued)

FOREIGN PATENT DOCUMENTS

JP           8-204704         8/1996

(Continued)

OTHER PUBLICATIONS

Sanjoy Sen, Midcom-unaware NAT/Firewall Traversal, Apr. 2002, Nortel Networks, pp. 14.*

(Continued)

*Primary Examiner*—Jeffrey Pwu
*Assistant Examiner*—Sulaiman Nooristany
(74) *Attorney, Agent, or Firm*—Wenderoth, Lind & Ponack, L.L.P.

(57) ABSTRACT

An internet terminal, which includes a communication unit for sending and receiving packet data, an encryption unit for encrypting and decrypting packet data, a packet generation unit for generating packet data to be sent to a server apparatus, a protocol determination unit for determining a communication protocol to be used between the internet terminal and the server apparatus, a control request reading unit for reading in packet data and a control request packet that includes a control request, a control unit for receiving control information and controlling the internet terminal or a terminal apparatus accordingly. Further, the internet terminal includes a server certificate authentication unit for authenticating the validity of a server certificate sent by the server apparatus, a client certificate management unit for sending a client certificate to the server apparatus, and a storage unit for storing a terminal ID and other information.

29 Claims, 15 Drawing Sheets

U.S. PATENT DOCUMENTS

| | | | |
|---|---|---|---|
| 6,466,971 B1 * | 10/2002 | Humpleman et al. | 709/220 |
| 6,546,419 B1 * | 4/2003 | Humpleman et al. | 709/223 |
| 6,581,107 B1 | 6/2003 | Deac | |
| 7,010,002 B2 * | 3/2006 | Chow et al. | 370/485 |
| 7,103,663 B2 * | 9/2006 | Inoue et al. | 709/225 |
| 7,256,704 B2 * | 8/2007 | Yoon et al. | 340/825 |
| 2001/0005906 A1 * | 6/2001 | Humpleman | 725/82 |
| 2002/0103898 A1 * | 8/2002 | Moyer et al. | 709/224 |
| 2003/0061380 A1 * | 3/2003 | Saito et al. | 709/238 |
| 2005/0015584 A1 | 1/2005 | Takechi et al. | |
| 2006/0259184 A1 * | 11/2006 | Hayes et al. | 700/221 |

FOREIGN PATENT DOCUMENTS

| | | |
|---|---|---|
| JP | 2000-078171 | 3/2000 |
| JP | 2000-183923 | 6/2000 |
| JP | 2000-341337 | 12/2000 |
| JP | 2001-136202 | 5/2001 |
| JP | 3445986 | 6/2003 |
| WO | 02/09105 | 1/2002 |

OTHER PUBLICATIONS

S. Sen et al., "<draft-sen-midcom-fw-nat-01>: Midcom unaware NAT/Firewall Traversal", IETF Internet Draft, 'Online', Apr. 2002, pp. 1-15, XP0002266728, retrieved from the internet: <URL:www.watersprings.org> on Jan. 13, 2004.

S. Moyer et al., "<draft-moyer-sip-appliances-framework-02>: Framework Draft for Networked Appliances using the Session Initiation Protocol", IETF Internet Draft, 'online' Jun. 2001, pp. 1-37, XP0002266729, retrieved from the internet: <URL:www.watersprings.org> on Jan. 13, 2004.

P. Srisuresh et al., "RFC 3022—Traditional IP Network Translator (Traditional NAT)", IETF Internet Standard, Jan. 2001, pp. 1-16, XP0002227044, retrieved from the internet: <URL:http://kaizi.viagenie.qc.ca/ietf/rfc/rfc3022.txt> on Jan. 13, 2003.

M. Handley et al., "SIP: Session Initiation Protocol", Standards Track, Mar. 1999, pp. 1-153.

* cited by examiner

| Local network side | | Internet side | |
|---|---|---|---|
| Local address | Port number | Global address | Port number |
| 192.168.0.2 | 5000 | 200.123.4.5 | 6000 |
| 192.168.0.3 | 5000 | 200.123.4.5 | 6080 |
| 192.168.0.4 | 5000 | 200.123.4.5 | 6083 |
| ⋮ | ⋮ | ⋮ | ⋮ |

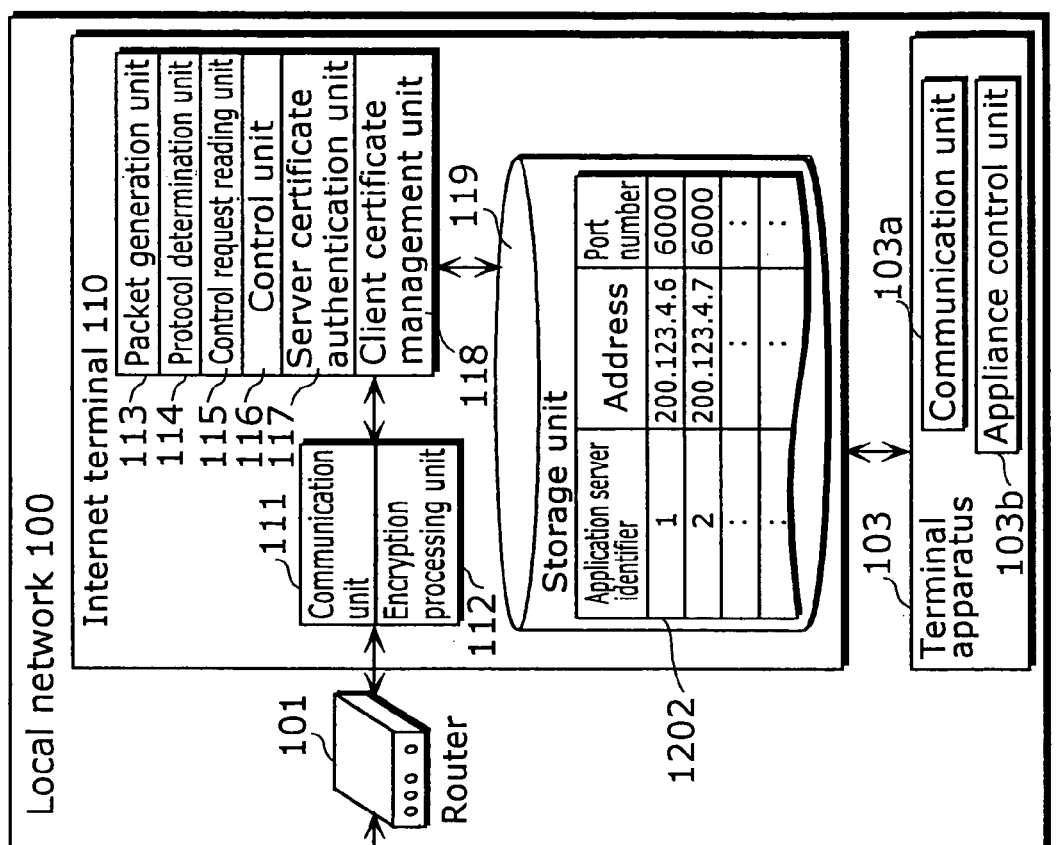
Fig. 12
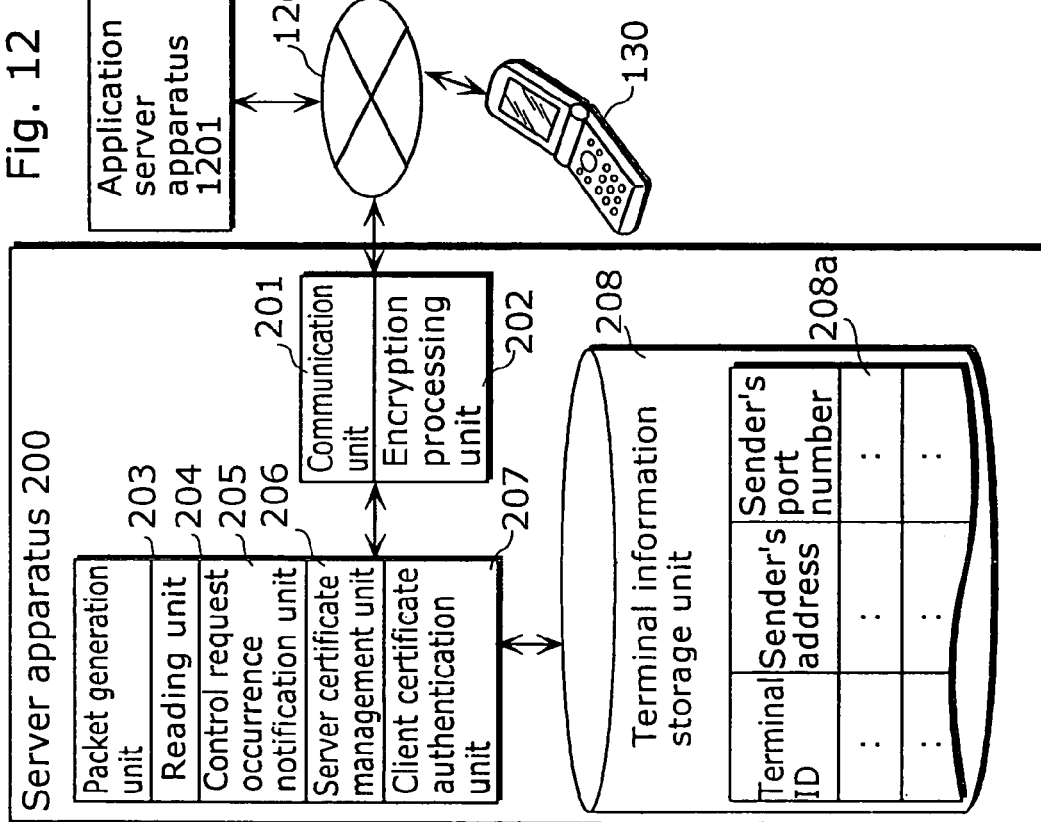

| Application server identifier | URL |
|---|---|
| 1 | server1.co.jp |
| 2 | server2.co.jp |
| ⋮ | ⋮ |
| ⋮ | ⋮ |

APPARATUS, METHOD AND COMPUTER SOFTWARE PRODUCTS FOR CONTROLLING A HOME TERMINAL

FIELD OF THE INVENTION

The present invention relates to a home terminal apparatus for sending and receiving packet data to and from a router connected to an external network, the home terminal apparatus being connected to the router via a home network, and a communication system using said home terminal apparatus.

DESCRIPTION OF THE RELATED ART

Recently, access networks such as ADSL (Asymmetric Digital Subscriber Line), optical fiber network and the like which are broadband capable of handling a large amount of communication data and which are accessible at all times have been widespread at an accelerated rate even among ordinary homes. At the same time, many kinds of home networks for organically connecting home appliances at home with one another are under standardization. Under these circumstances, it is expected that a user of these home appliances will be able to operate them from an outside location by remotely operating his/her mobile terminal which can be connected to the Internet and by transmitting control information to such home appliances via the Internet and a home network.

When a connection is made between external and home networks in a conventional method: (i) a plurality of home internet terminals assigned with local addresses are connected, via a home network, to a router connected to an internet network; (ii) the router is connected to the internet network via an internet service provider (ISP) using a communication line; and (iii) the internet service provider (ISP) assigns a global address to the router.

When an external server apparatus makes a control request to an internet terminal at home by the use of a global address, the following conventional methods are used: a router is set to perform static IP masquerading (e.g. Japanese Laid-Open Patent Application No. 2000-341337) and an internet terminal performs polling (e.g. Japanese Laid-Open Patent Application No. 08-204704 and Japanese Laid-Open Patent Application No. 2000-183923).

In static IP masquerading, a router, when receiving packet data in which a specific port number is described as a destination port number, converts the destination address into the local address of an internet terminal, and then routes the packet data to the internet terminal, with a global address and local addresses being registered in a conversion table as fixed addresses in advance. Therefore, it is possible in static IP masquerading to commence a session not only from the local side but also from the global side.

In the method in which an internet terminal performs polling, on the other hand, a router receives, from an internet terminal, a local packet to be sent to a server apparatus, and sends such a packet to the server apparatus after converting the sender's address included in the packet into the global address of the router and converting the sender's port number included in the packet into a port number which can be used by the router. When this is done, a set of information including the local address of the internet terminal, the global address of the router, the sender's port number of the internet terminal, and the sender's port number of the router is to be stored in the conversion table for a specified period of time. Then, when receiving, from the server apparatus, a response global packet that includes control information intended for the internet terminal, the router specifies the destination on the local network by converting the destination address and the destination port number included in the response global packet respectively into the local address of the internet terminal and the destination port number of the internet terminal with reference to the conversion table, and routes the packet to the internet terminal.

In the static IP masquerading and the polling method, TCP, which is a connection protocol, is generally used as a communication protocol.

Meanwhile, there is disclosed another polling method (e.g., Japanese Laid-Open Patent Application No. 2000-183923) which improves transmission efficiency and delay characteristics in a case where there is a significant difference or a temporal variation in traffic between communication apparatuses.

However, when a user wishes to remotely control his/her home terminal apparatus from an outside location via the internet, it is necessary to take countermeasures against security threats that could occur on the internet. For example, when a malicious third person makes an attack to turn on air conditioners in many houses all at once, it is assumable that such attack will cause electricity shock. Therefore, it is required to prevent the leakage of a control request on the internet, malicious third person's spoofing and others.

Also, remote control information to be sent to a home terminal apparatus (e.g., home appliance) from a user in an outside location is required to be sent to the target home terminal apparatus immediately. However, when an internet terminal makes an inquiry to a server apparatus according to a simple polling method, the immediacy of the control request to control a home appliance is lost because of the fact that there is a polling interval. Also, there is another problem that a setting for static IP masquerading cannot be made to a router depending on the type or the implementation of the router.

SUMMARY OF THE INVENTION

The present invention is intended to solve the above problems whose first object is to provide a home terminal apparatus that enables control information which a user sends to a home terminal apparatus such as a home appliance and the like from an outside location, to be immediately sent to a terminal apparatus to be controlled by utilizing an existing router, with a secure communication being realized in sending/receiving such control information.

The second object is to provide a home terminal apparatus that enables the user to remotely control a home terminal apparatus from outside home in a highly secure manner using the user's mobile terminal device, soon after purchasing the home terminal apparatus, without needing to make complicated settings to the home terminal apparatus and a router.

The home terminal apparatus according to the present inventions is a home terminal apparatus for sending/receiving packet data to and from a router that is connected to an external network to which a server apparatus is connected, the home terminal apparatus being connected to the router via a home network, including a packet generation unit operable to generate packet data to be sent to the server apparatus, a protocol determination unit operable to determine a communication protocol used between the home terminal apparatus and the server apparatus, and a communication unit operable to send/receive the packet data to and from the server apparatus via the router, wherein the protocol determination unit determines that the home terminal apparatus should communicate with the server apparatus using (i) a first communication protocol when the communication unit sends address notification packet data generated by the packet generation unit to the server apparatus periodically and repeatedly at a predetermined sending interval via the router, and (ii) a second communication protocol when the communication unit sends/receives control information to and from the server apparatus.

Accordingly, since packet data is periodically sent to the router, it is possible for the router to always hold a corresponding relationship between global and local addresses. This allows remote control information to be sent to a target terminal apparatus at home at any time from a mobile terminal in an outside location. Furthermore, since control information to control a home appliance and the like transmitted between the server apparatus and the home terminal apparatus is sent/received after a communication protocol between these apparatuses is switched to a secure protocol, it is possible to reliably prevent a third person from illicitly controlling the home appliance by means of tampering and tapping the control information or "spoofing".

Also, in the home terminal apparatus according to the present invention, the server apparatus includes a second communication unit operable to send/receive packet data, and a second packet generation unit operable to generate packet data to be sent to the home terminal apparatus, wherein the second packet generation unit generates the notification packet indicating the occurrence of the control request to control the home terminal apparatus, when said control request occurred in the server apparatus, and the second communication unit sends said notification packet to the home terminal apparatus via the router.

Accordingly, it is possible for the server apparatus, which received control information for controlling the home terminal apparatus from the mobile terminal device, to send, to the home terminal apparatus, a notification packet indicating an occurrence of the control information before sending such control information to the home terminal apparatus, so as to send a control request after a secure communication protocol is established. This results in enhanced security in communications.

Note that not only is it possible for the present invention to be embodied as a home terminal apparatus as described above, but also as a communication system composed of the home terminal apparatus, the router and the server apparatus, and as a communication method that includes, as its steps, the units of the home terminal apparatus. Furthermore, the present invention is also capable of being embodied as a program that causes a computer and the like to execute the above communication method. It should be also understood that such program can be distributed via recording media such as DVDs and CD-ROMs as well as via transmission media such as a communication network.

As described above, since the home terminal apparatus according to the present invention sends address notification packet data periodically and repeatedly to the router using a connectionless UDP protocol, it is possible for the router to always hold a corresponding relationship table that lists a corresponding relationship between global and local addresses. This solves the problem that the router cannot convert the global address it stores into a local address of a destination home terminal apparatus, enabling remote control information from a mobile terminal device to be always sent to the target terminal apparatus. Moreover, since UDP which involves a small amount of communication data is used as a communication protocol, it is possible to lighten the processing load to be placed on the server apparatus, the router, and the home terminal apparatus.

Further, since control information to control a home appliance and the like, transmitted between the home terminal apparatus and the server apparatus, is sent after an authentication is performed and channel encryption is performed, the communication protocol between these apparatuses is switched to TCP, it is possible to reliably prevent a third person from tampering and tapping control information and spoofing to illicitly control a home appliance. Accordingly, the user's anxiety will be eliminated concerning the handling of control information.

Moreover, since the polling method is used for the router, the user is not required to have any technical knowledge to setup the router. Accordingly, by just getting connected to the router, the user who purchased a home terminal apparatus can remotely operate home appliances from an outside location using a mobile terminal device. This allows a dramatic improvement in the convenience of such user.

For further information about the technical background to this application, Japanese Patent Application No. 2002-286753 filed on Sep. 30, 2002, is incorporated herein by reference.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 6 is a reference diagram showing a corresponding relationship table held by the router according to the first embodiment.

FIG. 12 is a diagram showing an entire configuration of a communication system according to a second embodiment.

FIG. 15 is a diagram showing an example of application server identifier/address information.

DETAILED DESCRIPTION OF THE INVENTION

An explanation is given of a communication system that incorporates an internet terminal according to the present invention, with reference to the figures.

First Embodiment

Figure 1:
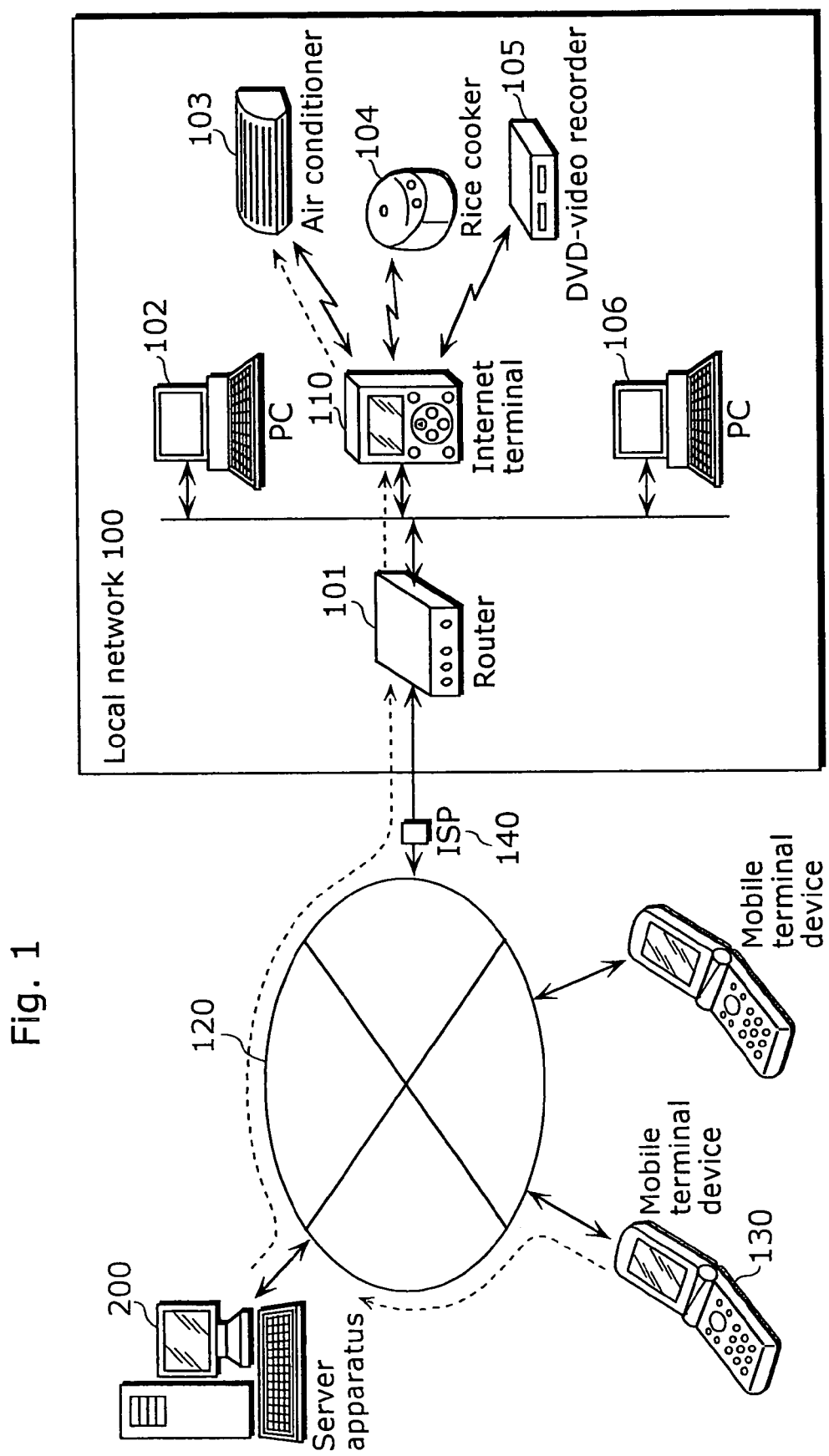
FIG. 1 is a schematic diagram showing an entire configuration of a communication system according to a first embodiment.

FIG. 1 is a schematic diagram showing an entire configuration of a communication system according to the first embodiment. The communication system according to the first embodiment is characterized by that it is possible to receive control information from a mobile terminal device 130 in an outside location and to transmit, to an internet terminal 110 at home, a control request that has occurred in a server apparatus 200 in real time and in a secure manner. Note that the networks according to the first embodiment are on an always-on state using ADSL, optical fiber and the like.

Also note that the internet terminal 110 at home according to the present invention utilizes the characteristics of a router 101 when a connectionless UDP is used as a communication protocol as well as a secure communication channel realized by higher protocol layers such as TCP and SSL, and therefore there is no need to add a new functionality to the router 101 itself.

In a communication using a connectionless UDP protocol, the router 101 holds a corresponding relationship between a local address and a global address only for a certain period of time at the time of sending/receiving packet data, since it is unknown whether or not there will be a response from the party on the other end of the communication. Thus, the home internet terminal apparatus 110 according to the present invention utilizes the characteristics of the router 101 under UDP.

In a general communication using TCP, a conversion table (to be also referred to as "corresponding relationship table" hereinafter) is generated when a connection is established between two parties sending/receiving data, and a corresponding relationship between local and global addresses is deleted when such connection is broken. Also, a session needs to be established between the internet terminal 110 and the server apparatus 200 before a communication is started. Accordingly, a load is placed on the server apparatus 200 because an acknowledgement should be made every time packet data is sent/received, while at the same time a highly secure communication can be achieved because of the reason that TCP has high affinity with the encryption of a communication channel as well as authentication processing. On the other hand, a connectionless UDP protocol allows a high-speed communication since packet data is sent unilaterally without a receipt acknowledgment on the receiver's side, while providing a less accurate communication because it is not intended for various kinds of communication control (e.g., packet data receipt acknowledgment and error correction) which are in the scope of TCP.

The communication system illustrated in FIG. 1 is composed of the server apparatus 200, an internet network 120, a mobile terminal device 130, the router 101, and the internet terminal 110, each of which are connected to one another via a cable or wireless communication line.

In a local network 100, the router 101 routes incoming and outgoing packet data to and from the house in an integrated manner, and the router 101 and a PC 102, a PC 106 and others inside the house are connected to each other via a LAN and the like. Also, the router 101 is connected to home appliances such as an air conditioner 103, a rice cooker 104, and a DVD video recorder 105 via radio waves from the internet terminal 110, using a communication protocol such as ECHONET.

The router 101 is capable of routing packet data transmitted between the external and home networks, converting an IP address described in an IP header from a global address to a local address, and intentionally destroying packet data that matches a predetermined condition.

Connected to the internet network 120 are the mobile terminal device 130 such as a mobile phone by which the user can send control information from an outside location and the server apparatus 200 dedicated to receiving control information sent by the user and sending it to the internet terminal 110 at home, so as to remotely control a home appliance and the like.

Dotted lines shown in FIG. 1 indicate the flow of remote control information. Control information sent by the user of the mobile terminal device 130 is sent to the server apparatus 200, which then specifies the global address of the router 101 on the home network, using a user ID, a telephone number, a password, and the like. Next, the server apparatus 200 sends, to the internet terminal 110 to be controlled, a global packet added with the global address, the terminal ID and others.

Note that the home appliance 103 and others on the local network 100 are wirelessly connected to the internet terminal 110, but the present invention is not limited to this configuration, and therefore it is also possible that control information can be transmitted with the home appliance 103 and others being connected directly to the local network.

Figure 2:
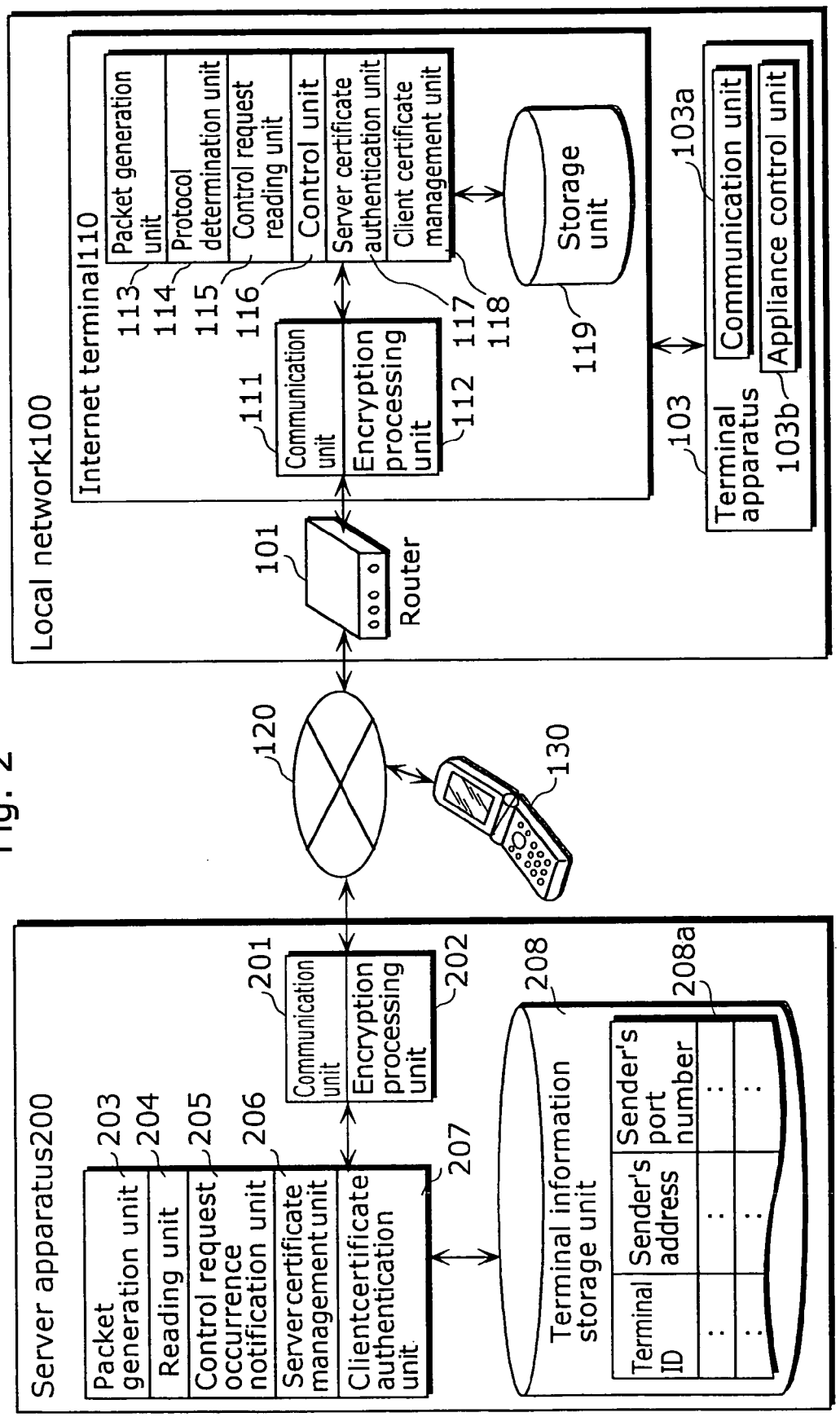
FIG. 2 is an example functional block diagram showing a server apparatus, an internet terminal, and a terminal apparatus and the like such as a home appliance according to the first embodiment.

FIG. 2 is an example functional block diagram showing the server apparatus 200, the internet terminal 110, and the terminal apparatus 103 such as a home appliance.

The server apparatus 200 is capable of receiving control information from the mobile terminal device 130, as well as notifying the internet terminal 110 that a control request has occurred, before sending such control information to the internet terminal 110. Moreover, the server apparatus 200 is characterized by that it generates packet data resulted by adding destination address information to the control information and sends it to the target internet terminal 110 on the local network, after a secure communication is established between the server apparatus 200 and the internet terminal 110.

Such server apparatus 200 is comprised of a communication unit 201, an encryption processing unit 202, a packet generation unit 203, a reading unit 204, a control request occurrence notification unit 205, a server certificate management unit 206, a client certificate authentication unit 207, and a terminal information storage unit 208.

The communication unit 201 sends, to the router 101, packet data generated by the packet generation unit 203 via the internet network 120, and receives packet data sent from the mobile terminal device 130 and the router 101.

The encryption processing unit 202 encrypts and decrypts packet data sent/received by the communication unit 201.

The packet generation unit 203 generates packet data made up of a header part and a data part to be sent from the server apparatus 200 to the internet terminal 110. The data part includes information such as a control request occurrence notification.

The reading unit 204 reads a control request to control the internet terminal 110 sent from the mobile terminal device 130 to the server apparatus 200.

The control request occurrence notification unit 205 instructs the packet generation unit 203 to generate a control request occurrence notification frame in order to notify the internet terminal 110 of an occurrence of a control request.

The server certificate management unit 206 holds a server certificate to verify the validity of the server apparatus 200, and sends the server certificate to the internet terminal 110.

The client certificate authentication unit 207 authenticates the validity of a client certificate sent from the internet terminal 110, using a public key and the like of a certificate authority.

The terminal information storage unit 208 stores a table 208a in which the following information is recorded as a set of terminal information: the terminal ID, the sender's address, and the sender's port number included in the global packet sent by the router 101.

The router 101 is a routing device for routing packet data on the external and local networks, and the internet terminal 110 and others inside the house are connected to the external network via the router 101 in an integrated manner.

The router 101 is assigned with a unique global address by the internet service provider (ISP) 140, and a local packet sent by the router 101 is delivered to a router of such internet service provider. The local packet is then sent to the server apparatus 200 as a destination over the internet network 120.

The mobile terminal device 130 is a device for selecting control information used by the user in an outside location to remotely operate the home appliance 103 and the like at home. Examples of control information are "start the rice cooker at six" and "turn on the air conditioner immediately". The mobile terminal device 130 is also capable of receiving information indicating the result of controlling the home appliance 103 and the like.

The internet terminal 110 is a terminal apparatus capable of managing the home appliance 103 and others at home in an integrated manner. The user can control the home appliance 103 and others in an integrated manner by sending control information to this internet terminal 110. Note that an example of a communication protocol used for a communication between the internet terminal 110 and the home appliance 103 and the like is ECHONET. A unique local address is assigned by the router 101 respectively to the internet terminal 110, the PC 102, and others.

The internet terminal 110 is comprised of a communication unit 111, an encryption processing unit 112, a packet generation unit 113, a protocol determination unit 114, a control request reading unit 115, a control unit 116, a server certificate authentication unit 117, a client certificate management unit 118, and a storage unit 119.

The communication unit 111 sends and receives packet data to and from the router 101 via the local network.

The encryption processing unit 112 encrypts the data part of packet data to be sent to the server apparatus 200 and decrypts packet data sent by the server apparatus 200.

The packet generation unit 113 generates packet data to be sent to the server apparatus 200. Packet data to be used is a UDP packet, a TCP packet and the like.

The protocol determination unit 114 determines which communication protocol should be used between the internet terminal 110 and the server apparatus 200. Note that the protocol determination unit 114 instructs the packet generation unit 113 to generate a TCP connection request packet when making a request to establish a TCP connection. Note that since the data structure of a TCP connection request packet is specified in TCP and IP, an explanation thereof is not given in the first embodiment.

The control request reading unit 115 reads in packets sent by the server apparatus 200 such as packet data for making a control request notification and a control request packet including a control request, and notifies the protocol determination unit 114 and the control unit 116 of the result of reading such packet data.

The control unit 116 receives a control request from the control request reading unit 114, and controls the internet terminal 110 or the terminal apparatus 103 accordingly. Note that "control" described in the explanation of the first embodiment includes: power ON/OFF of a terminal apparatus, change in a numeric value which was set before, screen display, print instruction, program activation, data transmission to another terminal apparatus. More specifically, control information is "program the DVD-video recorder to record a TV program at seven", "check whether the cooking stove is turned off" and so forth.

The server certificate authentication unit 117 authenticates the validity of a server certificate sent by the server apparatus 200, using a public key and the like included in a root CA certificate which it holds.

The client certificate management unit 118 holds a client certificate to verify the validity of the internet terminal 110, and sends such client certificate to the server apparatus 200.

The storage unit 119 holds information such as a terminal ID and the like used to identify the internet terminal 110.

In FIG. 2, home appliances connected to the internet terminal 110 include the air conditioner 103, the rice cooker 104, and the DVD-video recorder 105, which shall be connected to the internet terminal 110 in the first embodiment. However, these home appliances may also be connected directly to a wireless network, an electric wire, a LAN and other networks.

The terminal apparatus 103, which is a home appliance, has a communication unit 103a and an appliance control unit 103b. The communication unit 103a is a processing unit for sending and receiving control information to and from the control unit 116 of the internet terminal 110. The appliance control unit 103b receives a control command from the internet terminal 110 and controls the home appliance 103. An example control command is "start the rice cooker at ten."

Figure 3:
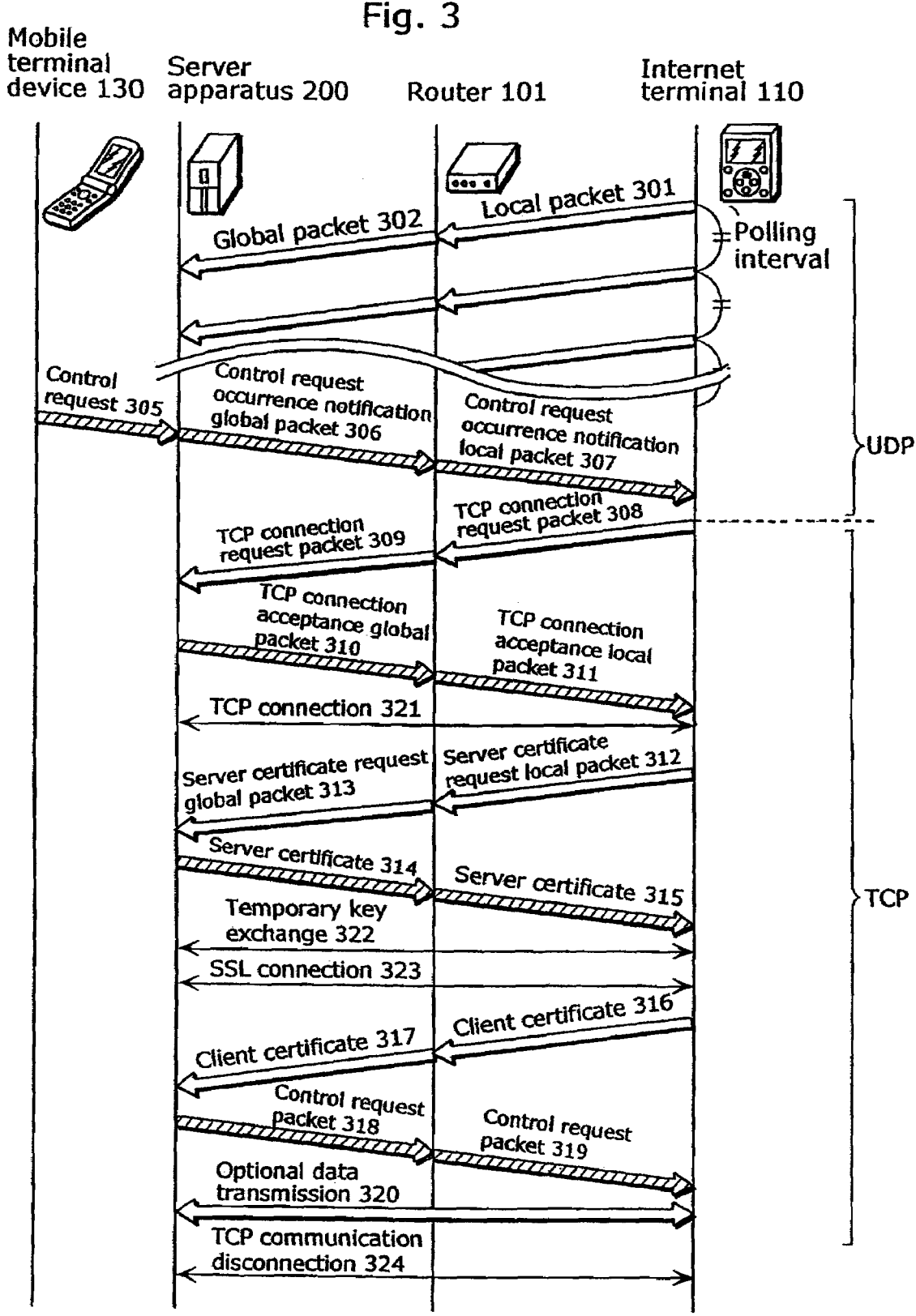
FIG. 3 is a sequence diagram showing the sending and receiving of local packets of the internet terminal according to the first embodiment.

FIG. 3 is a sequence diagram showing the sending and receiving of local packets of the internet terminal 110 according to the first embodiment.

The local packet 301, which is sent from the internet terminal 110 to the router 101, is made up of the header part which includes a destination address, a destination port number, a sender's address, and a sender's port number, and of the data part which includes data. Further, the sender's address and the sender's port number include the local IP address and the local port number of the internet terminal 110, and the destination address and the destination port number include the global IP address and the global port number of the server apparatus 200.

The global packet 302 is sent from the router 101 to the server apparatus 200. The sender's address and the sender's port number included in the global packet 302 are converted by the router 101 into a global address and a global port number unique to the router 101. The sender's address and the sender's port number include the global IP address and the global port number of the server apparatus 200.

In the present invention, the internet terminal 110 is characterized by that it periodically sends a local packet to the router 101 at every specified polling interval. Under UDP, the router 101 stores a communication status between the global and local sides in the corresponding relationship table for a certain period of time. Usually, a corresponding relationship between the local address and the global address in a local packet sent to the router 101 disappears after a holding period. In the present invention, however, the internet terminal 110 periodically sends packet data at every polling interval which is shorter than the holding period.

Accordingly, since a corresponding relationship between the local and global addresses is always stored in the router 101, it is possible for such router 101 to convert, from a global address to a local address, the destination address and the destination port number included in a control request occurrence notification global packet 306 sent from the server apparatus 200, which is always on the global side, for making a notification that a control request has occurred, and to route the packet to the internet terminal 110 to be controlled.

Next, an explanation is given of the communication sequence in a case where the control request 305 is made by the user from the mobile terminal device 130. In order to notify the internet terminal 110 of an occurrence of the control request 305, the server apparatus 200 sends the control request occurrence notification global packet 306 to the internet terminal 110 via the router 101. Then, the router 101 converts the global address included in such received packet into a local address as described above.

On the receipt of the control request occurrence notification local packet 307, the internet terminal 110 sends the TCP connection request packet 308 to the server apparatus 200 via the router 101 in order to start a session using TCP as a communication protocol. Then, the router 101 converts the local address included in such received packet into the global address as described above.

On the receipt of the TCP connection request packet 309, the server apparatus 200 sends a TCP connection acceptance global packet 310 to the router 101. The router 101 converts such received TCP connection acceptance global packet 310 from a global packet into a local packet, and sends the resultant to the internet terminal 110. A TCP connection 321 is established between the server apparatus 200 and the internet terminal 110 when the internet terminal 110 receives a TCP connection acceptance local packet 311.

Subsequently, the internet terminal 110 makes an attempt to establish a secure channel between the server apparatus 200 and itself. Note that the first embodiment is explained on the assumption that SSL (Secure Sockets Layer) is employed for the purpose of ensuring security. First, the internet terminal 110 sends a server certificate request local packet 312 to the router 101. The router 101 converts the received packet into a server certificate request global packet 313, and sends it to the server apparatus 200. On the receipt of such server certificate request global packet 313, the server apparatus 200 sends, to the internet terminal 110, a server certificate 314 held by the server certificate management unit 206 in order to be authenticated by the internet terminal 110. In the internet terminal 110, when the communication unit 111 receives a server certificate 315 via the router 101, the server certificate authentication unit 117 performs authentication on the server apparatus 200 to verify if it is an authorized communication partner.

Next, a temporary key exchange 322 is carried out to exchange a server private key which the server apparatus 200 already possesses with a server public key included in the server certificate 315 which the internet terminal 110 has received, so as to use such exchanged keys for encrypting and decrypting data to be exchanged in this communication. A typical temporary key standard is DES, 3DES and others. The above exchange is carried out in order that the server apparatus 200 and the internet terminal 110 will be able to select the type of a key standard which both of them can support. When the temporary key exchange completes, it becomes possible for both parties to encrypt data exchanged between them, marking the establishment of an SSL connection 323.

Then, the internet terminal 110 sends, to the router 101, a client certificate 316 which the client certificate management unit 118 holds. In the server apparatus 200, the communication unit 201 receives a client certificate 317 via the router 101, and the client certificate authentication unit 207 performs authentication on the internet terminal 110 in order to verify if the internet terminal 110 is an authorized communication partner.

It is after authenticating each other as authorized communication partners that the internet terminal 110 and the server apparatus 200 start communicating with each other. Accordingly, the server apparatus 200 sends, to the router 101, a control request packet 318 in which the control request is stored, and the internet terminal 110 receives, via the router 101, the a control request packet 319 in a secure manner.

After this, an optional data transmission 320 is carried out between the server apparatus 200 and the internet terminal 110 according to need. An example of such optional data transmission 320 is a notification and the like of a "control result" from the internet terminal 110 to the server apparatus 200.

Finally, a TCP communication disconnection 324 is made between the server apparatus 200 and the internet terminal 110 at the completion of the data transmission.

Note that, in the first embodiment, it is possible to prevent a third person's "spoofing" and the like by having the server apparatus 200 and the internet terminal 110 exchange their certificates (server certificate and client certificate) and authenticate each other before the commencement of a communication. A standard to be employed for the certificates in the present embodiment may be either the X.509, which is a typical certificate format, or an original format to be determined beforehand by the server apparatus 200 and the internet terminal 110. Regarding the transmission of packet data, since encryption is performed using temporary keys which have been exchanged by following a secure procedure after the exchange of the certificates, it is possible to prevent the details of the data from being tapped, even when the packet data is copied while being transmitted.

Also note that the encryption of server authentication, client authentication, and data is not mandatory, and therefore at least one of these may not be encrypted depending of a requirement specification.

Figure 4:
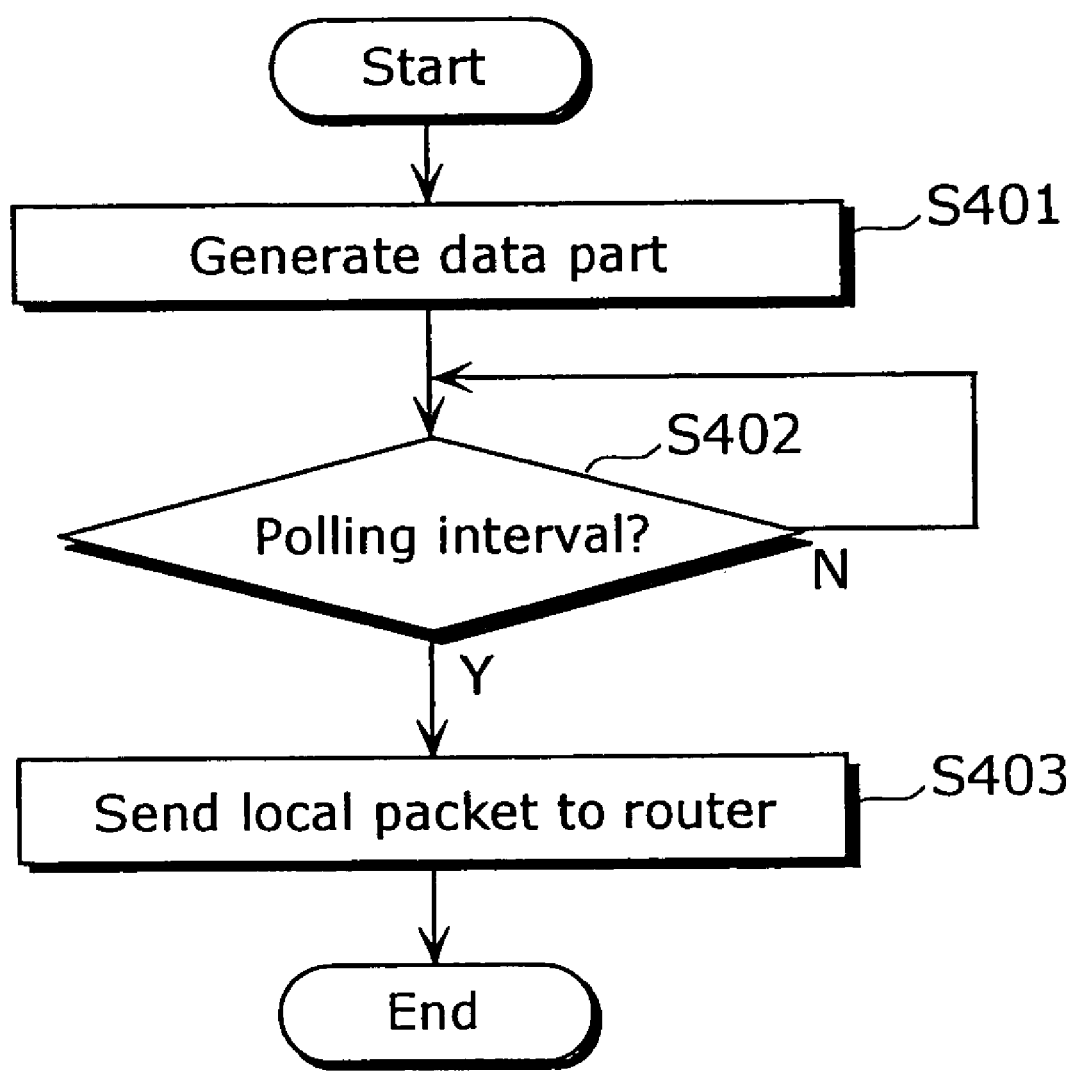
FIG. 4 is a flowchart showing an operating procedure to be followed by the internet terminal according to the first embodiment when sending an address notification local packet to the router periodically.

FIG. 4 is a flowchart showing the operating procedure to be followed by the internet terminal 110 according to the first embodiment when periodically sending an address notification local packet to the router 101.

The storage unit 119 in the internet terminal 110 holds terminal IDs and passwords, and the packet generation unit 113 generates a frame 1 incorporating a terminal ID and a password obtained from the storage unit 119, and passes it to the communication unit 111 (S401). The communication unit 111 adds, to the frame 1 which is a data part 502, a header part 501 that includes a destination address 503, a destination port number 504, a sender's address 505, and a sender's port number 506, and sends, to the router 101, the address notification local packet containing the header part 501 and the data part 502.

The communication unit 111 judges whether or not a predetermined polling interval has passed (S402). When the result of the judgment shows that the polling interval has passed (Y in S402), the communication unit 111 sends the address notification local packet to the router 101 (S403), whereas it obtains a polling interval when the result of the judgment shows that the predetermined polling interval has not yet passed (N in S402).

Figure 5:
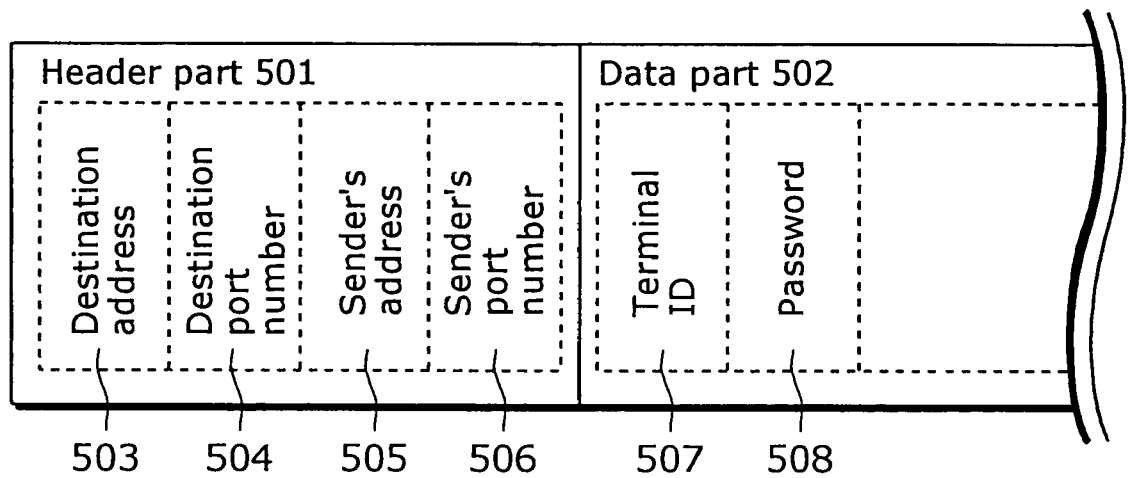
FIG. 5 is a diagram showing an example data structure of UDP address notification packet data sent from the internet terminal to the server apparatus according to the first embodiment.

FIG. 5 is a diagram showing an example data structure of address notification packet data sent from the internet terminal 110 to the server apparatus 200 according to the first embodiment. The header part 501 includes the following data: the destination address 503 as the address of the server apparatus 200; the destination port address 504 as a port number which the server apparatus 200 can use; the sender's address 505 as the address of the internet terminal 110; and the sender's port number 506 as the port number of the internet terminal 110. The data part 502 includes a terminal ID 507 for identifying the internet terminal 110 and a password 508 and the like. Note that an example data structure of a global packet is the same as that of a local packet illustrated in FIG. 5, but the difference between them is that the sender's address and port number in a global packet are converted by the router 101 from a local address to a global address.

FIG. 6 is a reference diagram showing a corresponding relationship table 600 held by the router 101 according to the first embodiment. The corresponding relationship table 600 lists, in a paired manner, local addresses and port numbers of the local network side and a global address and port numbers of the external network side. The router 101 makes a conversion between local and global addresses with reference to this corresponding relationship table 600.

An explanation is given of conversion processing performed by the router 101 when receiving a UDP local packet from the internet terminal 110 and converting it into a global packet so as to send the resultant to the server apparatus 200. When receiving the local packet, the router 101 generates a UDP global packet by converting the sender's address 505 included in the local packet into the global address of the router 101 and by converting the sender's port number 506 included in the local packet into a port number which the router 101 can use, with the aim of making an efficient use of the global address, and sends the generated global packet to the server apparatus 200.

Moreover, the router 101 stores, in the corresponding relationship table 600, a combination of the local address and the sender's port number of the internet terminal 110 and the global address and the port number of the router 101 as table information. Similarly, when receiving a UDP response local packet from the server apparatus 200, the router 101 updates the corresponding relationship table 600, and sends a response local packet to the internet terminal 110.

When UDP is used, the router 101 deletes a pair of the address and the port number of the internet terminal 110 and the address and the port number of the router 101 stored in the conversion table as a corresponding relationship, when there was no local packet or global packet received during a certain period of time. Meanwhile, when the conversion table does not list a pair of the above addresses and port numbers included in received packet data, such packet data received by the router 101 shall be destroyed.

Similarly, when the router 101 receives a TCP global packet from the server apparatus 200, it converts a global address included in the packet into a local address according to the conversion table, and routes a TCP local packet to the internet terminal 110.

Figure 7:
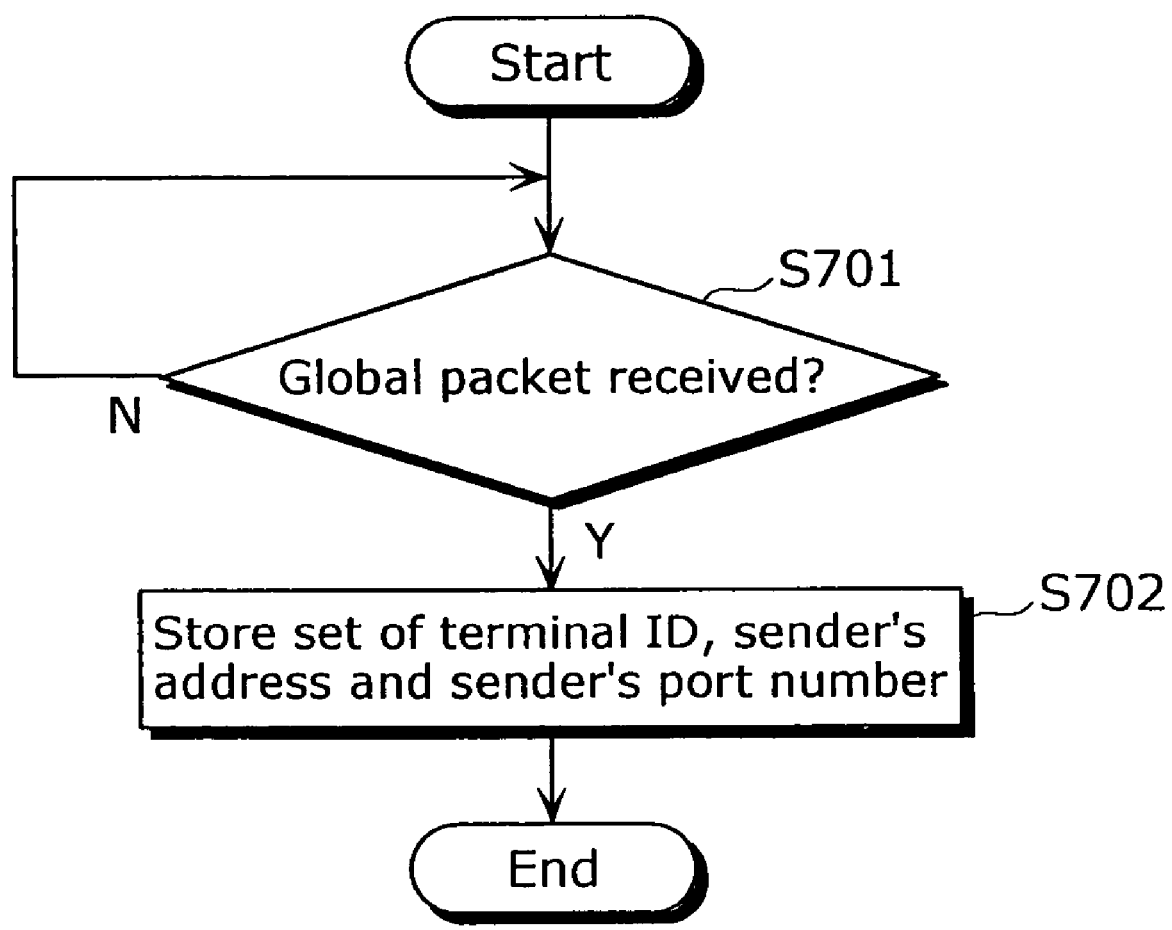
FIG. 7 is a flowchart showing an operating procedure followed by the server apparatus according to the first embodiment when receiving the address notification packet data from the internet terminal.

FIG. 7 is a flowchart showing the operating procedure followed by the server apparatus 200 according to the first embodiment when receiving the address notification packet data from the internet terminal 110.

First, the communication unit 201 of the server apparatus 200 performs the processing for receiving the global packet from the router 101 (S701). When the communication unit 201 receives the global packet (Y in S701), the terminal information storage unit 208 obtains a set of information including the terminal ID 507, the sender's address 505, and the sender's port number 506 included in the global packet, and generates and stores the table 208a, with the above obtained set of information as terminal information (S702).

Meanwhile, when the communication unit 201 does not receive the global packet (N in S701), it performs the receiving processing again. Note that the encryption processing unit 202 does not encrypt the address notification packet data in the first embodiment.

Figure 8:
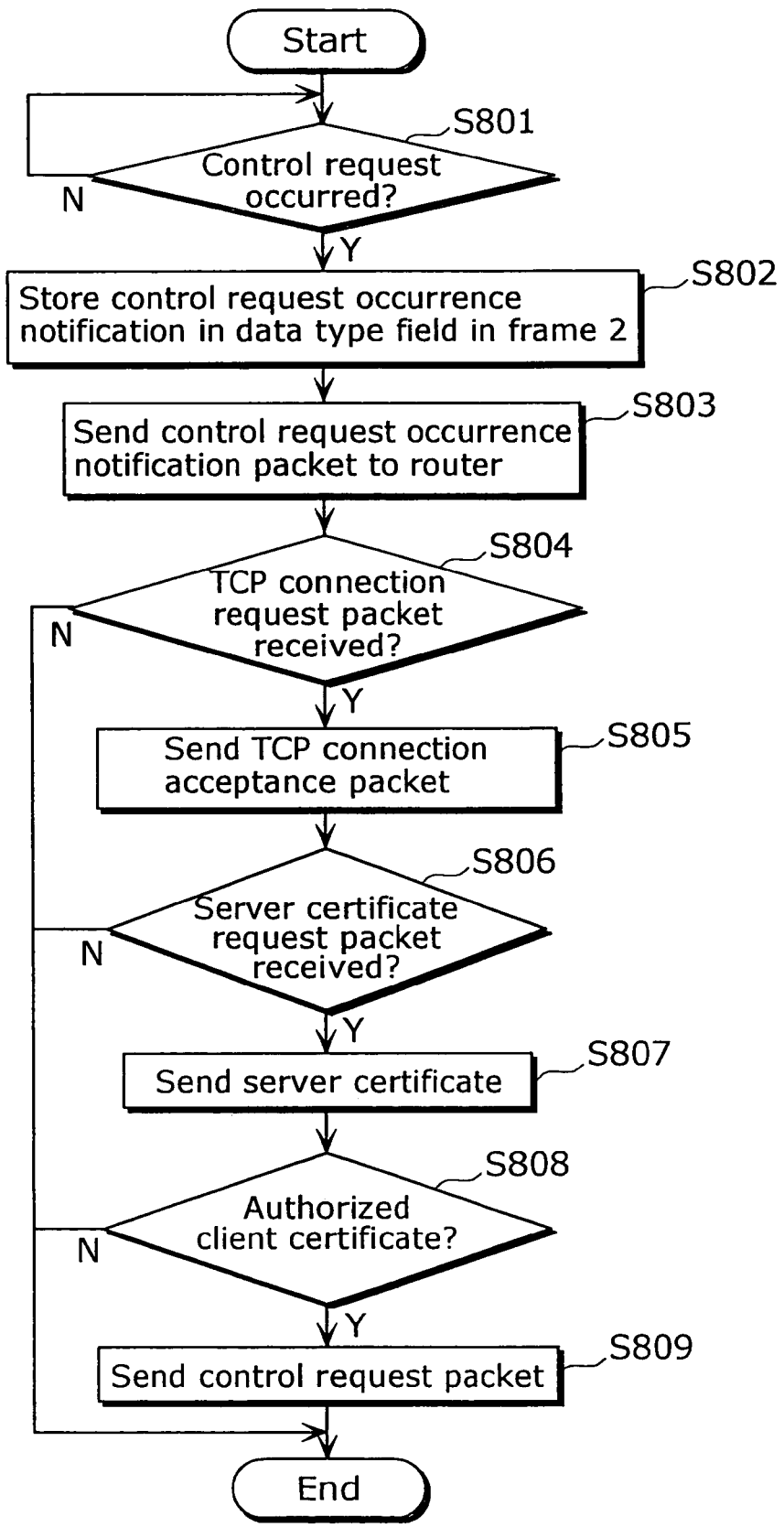
FIG. 8 is a flowchart showing an operating procedure followed by the server apparatus according to the first embodiment until it sends the control request to the internet terminal.

FIG. 8 is a flowchart showing the operating procedure followed by the server apparatus 200 according to the first embodiment until it sends the control request to the internet terminal 110.

When it is judged that there is a control request from the mobile terminal device 130 or when a control request occurs in the server apparatus 200 (Y in S801), the control request occurrence notification unit 205 instructs the packet generation unit 203 to generate a control request occurrence notification packet in which a control request occurrence notification is stored in the data type field in a frame 2.

Subsequently, the packet generation unit 203 generates a control request occurrence notification packet made up of a data part which includes the data type of the control request occurrence notification and the terminal ID of the internet terminal 110, and of a header part which includes sender's and destination addresses and port numbers which are extracted from the terminal information retained by the terminal information storage unit 208 according to the terminal ID (S802). Note that the data structure of such control request occurrence notification packet is explained later with reference to FIG. 9B.

Next, the communication unit 201 sends the control request occurrence notification packet to the router 101 (S803).

Then, the communication unit 201 of the server apparatus 200 judges whether or not a TCP connection request packet has been received from the internet terminal 110 (S804). When the result of the judgment shows that the communication unit 201 has not received the TCP connection request packet (N in S804), it terminates the control request receiving processing. On the other hand, when the communication unit 201 has received the TCP connection request packet (Y in S804), the packet generation unit 203 generates a TCP connection acceptance packet in which "TCP connection commencement notification" is stored in the data type field, and the communication unit 201 sends such generated TCP connection acceptance packet to the internet terminal 110 (S805). Accordingly, a TCP connection is established.

When the communication unit 201 of the server apparatus 200 receives a server certificate request packet from the internet terminal 110 (S806), the server certificate management unit 206 sends, to the internet terminal 110, a server certificate to verify that the server apparatus 200 is an authorized communication partner, via the communication unit 201 (S807). Here, the server certificate may be in the X.509 format, an original format or others. The server apparatus 200 and the internet terminal 110 exchange their temporary keys using a public key included in the server certificate, making it possible for an SSL connection to get started. Meanwhile, when not receiving the server certificate request packet, the communication unit 201 terminates the control request receiving processing (N in S806).

Next, the server apparatus 200 performs authentication on the client certificate sent by the internet terminal 110 (S808). More specifically, on the receipt of the client certificate, the client certificate authentication unit 207 of the server apparatus 200 performs authentication on such received client certificate. And when the validity of the internet terminal 110 cannot be verified (N in S808), the control request receiving processing is terminated.

When the validity of the internet terminal 110 has been verified (Y in S808), the server apparatus 200 sends a control request packet to the internet terminal 110 (S809). To be more specific, in order to generate and send a control request packet in compliance with TCP intended for notifying the internet terminal 110 about the control request: the packet generation unit 203 generates a data part that includes the control request command and adds a header part which describes sender and destination address and port number information; the encryption processing unit 202 encrypts such data part using the public key; and the communication unit 201 sends the generated control request packet to the router 101. Note that FIG. 9D illustrates an example of the TCP control request packet indicating the control request. This is the end of a series of processing performed by the server apparatus 200 according to the first embodiment when sending the control request.

Note that, instead of sending the control request packet automatically to the internet terminal 110 after authentications of the server certificate and the client certificate complete as described above, it is also conceivable that the server apparatus 200 sends the control request packet only when it receives, from the internet terminal 110, an inquiry packet for enquiring about the control request.

FIGS. 9A-9D are diagrams showing example data structures of packet data sent from the server apparatus 200 according to the present invention.

Figure 9A:
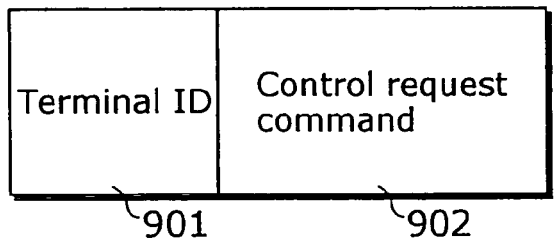
FIG. 9 is a diagram showing an example data structure of packet data sent from the server apparatus according to the present invention.

FIG. 9A illustrates the data structure of packet data including a control request command 902 generated in the server apparatus 200 in response to the control request and the like sent by the mobile terminal device 130. This packet data includes at least: a terminal ID 901 of the internet terminal 110 to be controlled; and the control request command 902 in which control information (e.g., "start operating the air conditioner at eight") is recorded.

Figure 9B:
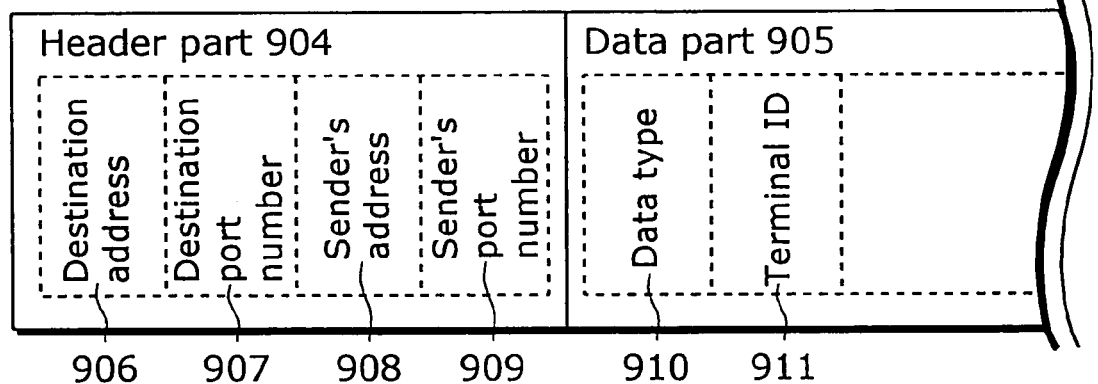

FIG. 9B is a diagram showing the data structure of a control request occurrence notification packet 903 sent from the server apparatus 200 to the internet terminal 110. A header part 904 contains a destination address 906, a destination port number 907, a sender's address 908 and a sender's port number 909. A data part 905 contains a data type 910 that includes an identifier for identifying the control request occurrence notification (to be referred to as "control request occurrence notification identifier" hereinafter), and a terminal ID 911 unique to the internet terminal 110.

Figure 9C:
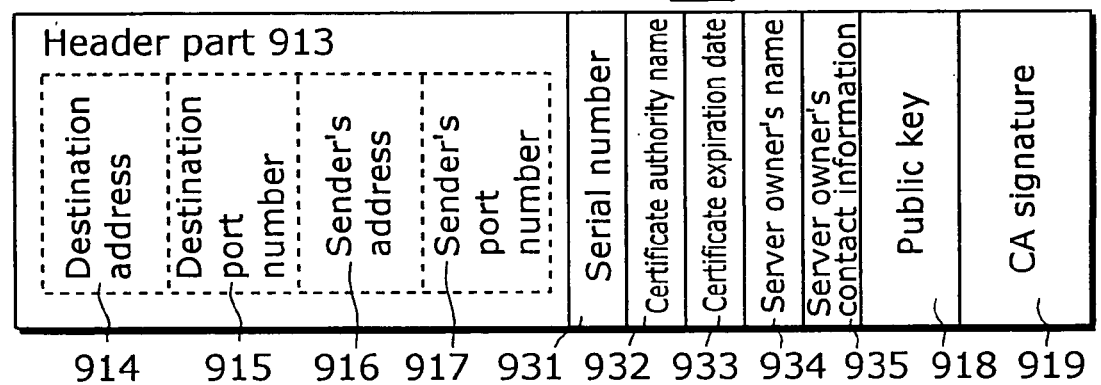
Figure 9D:
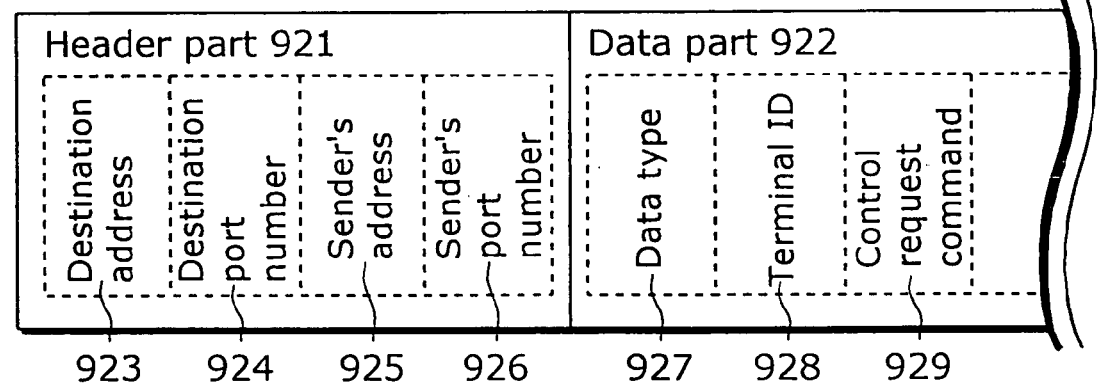

FIG. 9C illustrates the data structure of a packet 912 for sending the server certificate held by the server certificate management unit 206 of the server apparatus 200. The packet 912 is made up of a header part 913 that includes a destination address 914, a destination port number 915, a sender's address 916, and a sender's port number 917, as well as of a certificate serial number 931, a certificate authority name 932, a certificate expiration date 933, a server owner's name 934, a server owner's contact information (e.g. e-mail address) 935, a public key 918, and a CA signature 919 created by the certificate authority.

FIG. 9D illustrates an example data structure of a control request occurrence notification packet 920. A header part 921 contains a destination address 923, a destination port number 924, a sender's address 925 and a sender's port number 926. A data part 922 contains a data type 927 that includes a control request information notification identifier, a terminal ID 928 unique to the internet terminal 110, and a control request command 929, generated in the server apparatus 200, including a control request.

Figure 10:
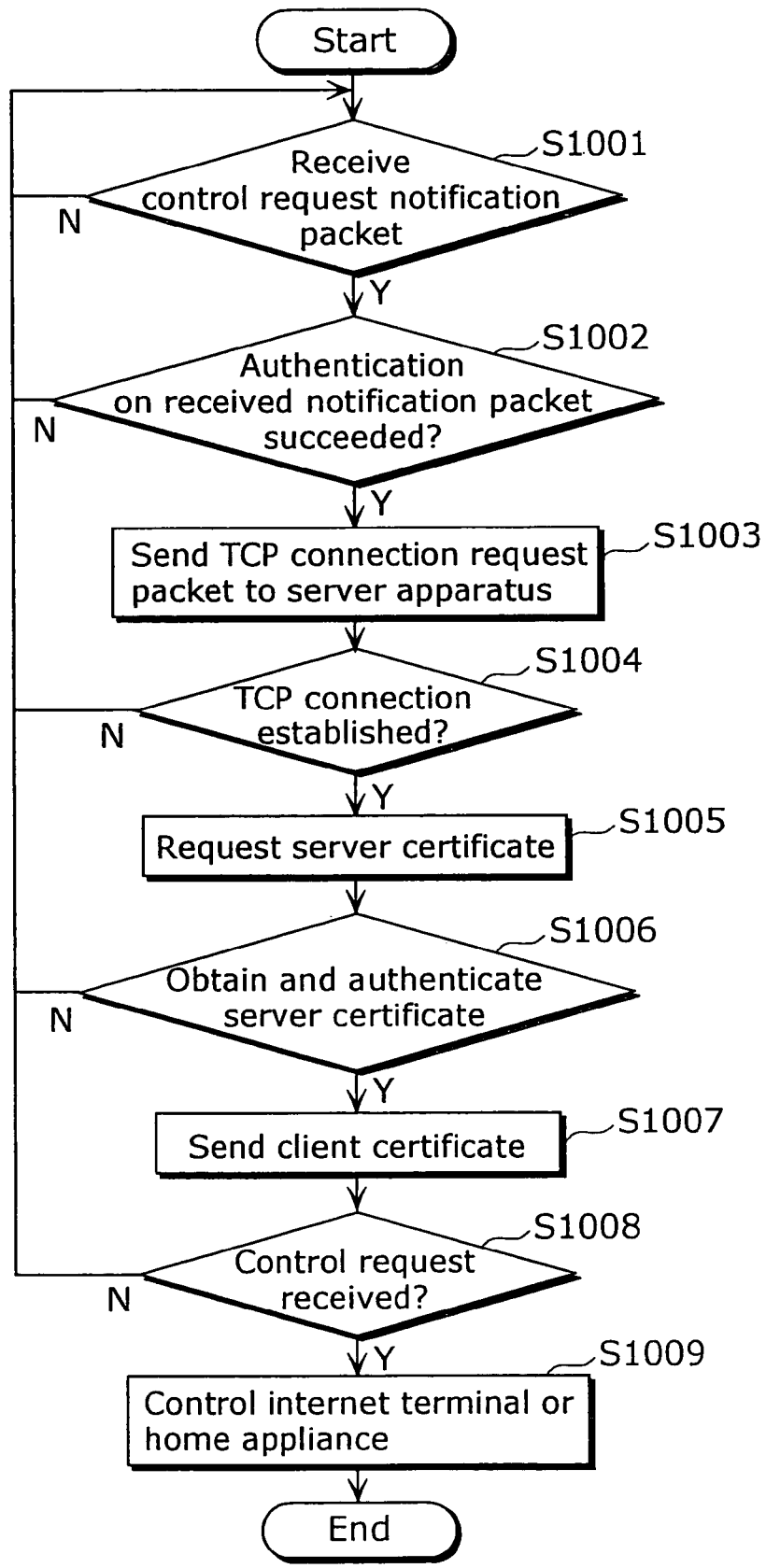
FIG. 10 is a flowchart showing an operating procedure followed by the internet terminal according to the first embodiment from when it receives a control request occurrence notification packet from the server apparatus to when it receives the control request.

FIG. 10 is a flowchart showing the operating procedure followed by the internet terminal 110 according to the first embodiment from when it receives the control request occurrence notification packet from the server apparatus 200 to when it receives the control request.

The communication unit 111 waits for receiving the control request occurrence notification packet (S1001). When the communication unit 111 receives the control request occurrence notification packet (Y in S1001), the control request reading unit 115 performs authentication of the received packet data (S1002). The control request reading unit 115 performs this authentication by making a judgment, for example, on the following points: (i) whether or not the data type 910 included in the data part 905 matches the control request occurrence notification identifier; (ii) whether or not the terminal ID 911 matches the terminal ID possessed by the internet terminal 110; (iii) whether or not the port number matches the local port number used when the frame 1 is generated; (iv) whether or not the IP address matches the IP address of the server apparatus 200 registered as a communication partner; and (v) whether or not the packet data is received within a predetermined interval. When any one of the above points is not satisfied, the communication unit 111 returns to the wait state for receiving a UDP local packet for control request occurrence notification (N in S1002). Note that the communication unit 111 waits for receiving the control request occurrence notification packet when it has not received the control request occurrence notification packet (N in S1001).

Meanwhile, when the control request reading unit 115 has verified all of the above points (Y in S1002), the packet generation unit 113 generates a TCP connection establishment packet, and the communication unit 111 sends it to the server apparatus 200 (S1003). The internet terminal 110 receives a TCP connection acceptance packet from the server apparatus 200, and establishes a TCP connection (S1004).

When a TCP connection is established (Y in S1004), the internet terminal 110 requests the server apparatus 200 to send the server certificate, in order to verify the validity of the server apparatus 200 as a communication partner (S1005). Upon the receipt of the server certificate, the server certificate authentication unit 117 performs authentication on such server certificate (S1006). This authentication is performed by the use of an SSL public key and a certificate authority's digital signature, for example, which are generally used.

When the validity of the received server certificate cannot be verified (N in S1006), the server certificate authentication unit 117 terminates a series of processing and waits for a control request occurrence notification packet again to determine that the internet terminal 110 is communicating with an unauthorized apparatus.

Meanwhile, when the server certificate authentication unit 117 has verified the validity of the received server certificate (Y in S1006), the client certificate management unit 118 sends, to the server apparatus 200, the client certificate attached with a digital signature for verifying the validity of the internet terminal 110 via the communication unit 111, to determine that the server apparatus 200 is an authorized communication partner (S1007). The client certificate may be in the X.509 format, an original format or the like.

Next, the communication unit 111 of the internet terminal 110 checks whether or not the control request packet has been received from the server apparatus 200 (S1008). When the communication unit 111 has received the control request packet (Y in S1008), the control request reading unit 115 reads out the control request command 809 included in the data part of the received control request packet. When the communication unit 111 fails to receive the control request packet (N in S1008), the communication unit 111 waits for receiving the control request occurrence notification packet again (S1001).

Then, the control unit 116 controls the internet terminal 110 or the home appliance 103 on connection, according to the control request command 809 included in the data part of the control request packet (S1009).

Note that the above-described server authentication may be omitted in the internet terminal 110 and the server apparatus 200 according to the first embodiment. Moreover, the client authentication may also be omitted according to need. When both the server authentication and the client authentication are performed, any one of them can be performed ahead of the other.

Figure 11:
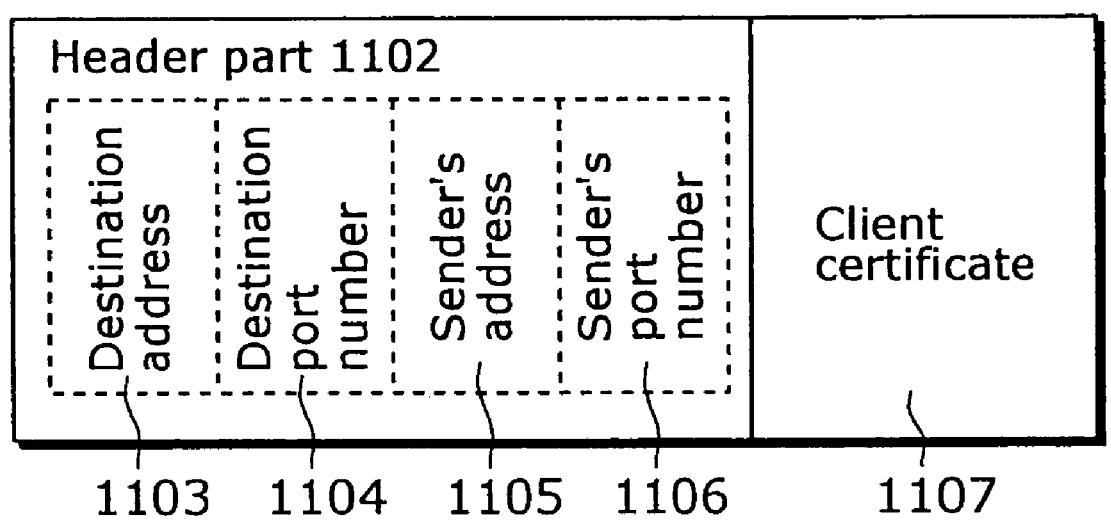
FIG. 11 is a diagram showing an example data structure of packet data for sending a client certificate from the internet terminal to the server apparatus.

FIG. 11 is a diagram showing an example data structure of packet data 1101 for sending the client certificate from the internet terminal 110 to the server apparatus 200.

This packet data 1101 for sending the client certificate has a general data structure which is made up of a header part 1102 including a destination address 1103, a destination port number 1104, a sender's address 1105, and a sender's port number 1106, as well as of a client certificate 1107.

As described above, the internet terminal 110 according to the first embodiment is comprised of the protocol determination unit 114 that determines whether to use UDP or TCP to communicate with the server apparatus 200, the control request reading unit 115 that reads out information included in received packet data, the server certificate authentication unit 117 that performs authentication on a communication partner using its server certificate, and the client certificate management unit 118 that manages a client certificate.

Accordingly, a connectionless UDP protocol that involves a light processing load and that realizes a real time communication is used for an address notification local packet to be periodically sent by the internet terminal 110 at a certain polling interval, whereas TCP, SSL and the like are used for sending/receiving information which requires security such as a control request to control a home appliance and the like, its control result, and related information, in order to realize a highly secure communication.

Furthermore, since the server certificate authentication unit 117 performs authentication of the server apparatus 200 as a communication partner, it is possible to reliably prevent a malicious third person from illicitly controlling the internet terminal 110 by means of "spoofing" and the like.

Further, since the internet terminal 110 according to the first embodiment sends a local packet to the server apparatus 200 periodically at a communication interval via the router 101, it is possible for the router 101 to always hold a corresponding relationship table that shows a relationship between global and local addresses and port numbers when the polling method is used. This allows control information to be sent from the global side to the local side at any time, making it possible for the user in an outside location to remotely operate the internet terminal 110 inside the house in real time by the use of the mobile terminal device 130.

Moreover, according to the present invention, since there is no need for making a setting for the router 101 by the use of the polling method, it is possible for the user to remotely operate a home appliance from an outside location by connecting the internet terminal 110 according to the present invention to the existing router 101.

Second Embodiment

Next, an explanation is given of another preferred embodiment according to the present invention. In the second embodiment, control information is sent to the internet terminal 110 from an application server apparatus 1201 to be explained below.

FIG. 12 is a diagram showing an entire configuration of a communication system according to the second embodiment. The communication system according to the second embodiment newly incorporates the application server apparatus 1201 in addition to the configuration of the communication system according to the above-explained first embodiment illustrated in FIG. 2, and is characterized by that a table 1202 is stored in the storage unit 119 in the internet terminal 110. Note that, in FIG. 12, the same constituent elements as those illustrated in FIG. 2 are assigned with the same numbers, and detailed explanations thereof are omitted.

This application server apparatus 1201 is a server which handles, for example, an application dedicated to remotely operating a home appliance at home from an outside location.

The table 1202 stored in the recording unit 119 holds application server identifier/address information made up of at least a set of an application server identifier for identifying the application server apparatus 1201, and a pair of the IP address and the port number of the application server apparatus 1201.

Next, an explanation is given of the operation in the communication system according to the second embodiment. When the user makes a control request from an outside location using the mobile terminal device 130, such control request is sent to the application server apparatus 1201. In the server apparatus 200, the control request occurrence notification unit 205 sends, to the internet terminal 110, a control request occurrence notification packet in which an application server identifier is further incorporated into the data part. Note that the data structure of the control request occurrence notification packet is explained later with reference to FIG. 13.

In the internet terminal 110, the control request reading unit 115 extracts, from the application server identifier/address information stored in the table 1202, an address and a port number that correspond to the application server identifier included in the data part of the above-received control request occurrence notification packet. Then, the communication unit 111 requests, via the router 101, the application server apparatus 1201 corresponding to the extracted address and port number to establish a TCP connection.

Note that the processing procedure followed by the internet terminal 110 and the server apparatus 200 after a TCP connection request packet is sent, is the same as that of the above-explained first embodiment.

Figure 13:
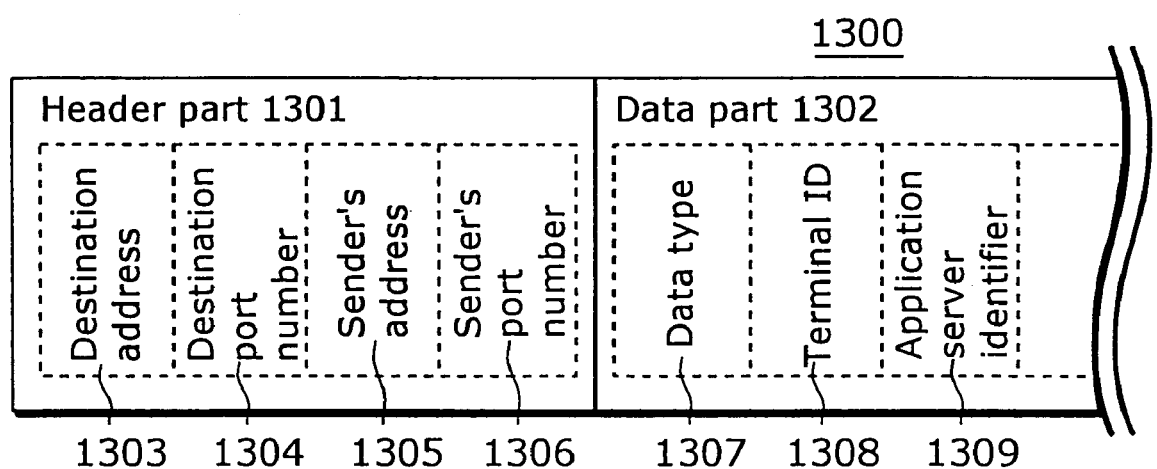
FIG. 13 is a diagram showing an example data structure of control request occurrence notification packet data sent by the server apparatus to the internet terminal according to a third embodiment.

FIG. 13 shows an example data structure of a control request occurrence notification packet 1300 sent by the server apparatus 200 to the internet terminal 110. Its header part 1301 contains a destination address 1303, a destination port number 1304, a sender's address 1305, and a sender's port number 1306, and its data part 1302 contains a data type 1307 that includes a control request occurrence notification identifier, a terminal ID 1308 unique to the internet terminal 110, and an identifier 1309 of the application server apparatus 1201.

As explained above, since the communication system according to the second embodiment incorporates the application server apparatus 1201, which uses a dedicated application for the internet terminal 110 for remotely operating a home appliance, it is possible for the server apparatus 200 to be shared as a control request receiving server, even when the system involves more than one application.

Moreover, even in a case where an internet terminal for providing a different kind of service is to be provided, it is possible to send address notification packet data to the same server apparatus 200 by appropriately using, depending on need, either the application server apparatus 1201 or the server apparatus 200 that periodically receives a packet.

Third Embodiment

Next, an explanation is given of another preferred embodiment using the internet terminal 110 according to the present invention. The third embodiment is characterized by that it incorporates an address list notification server apparatus 1401 for notifying the internet terminal 110 of a set of application server identifier/address information stored in the table 1202 of the storage unit 119 via the router 101.

Figure 14:
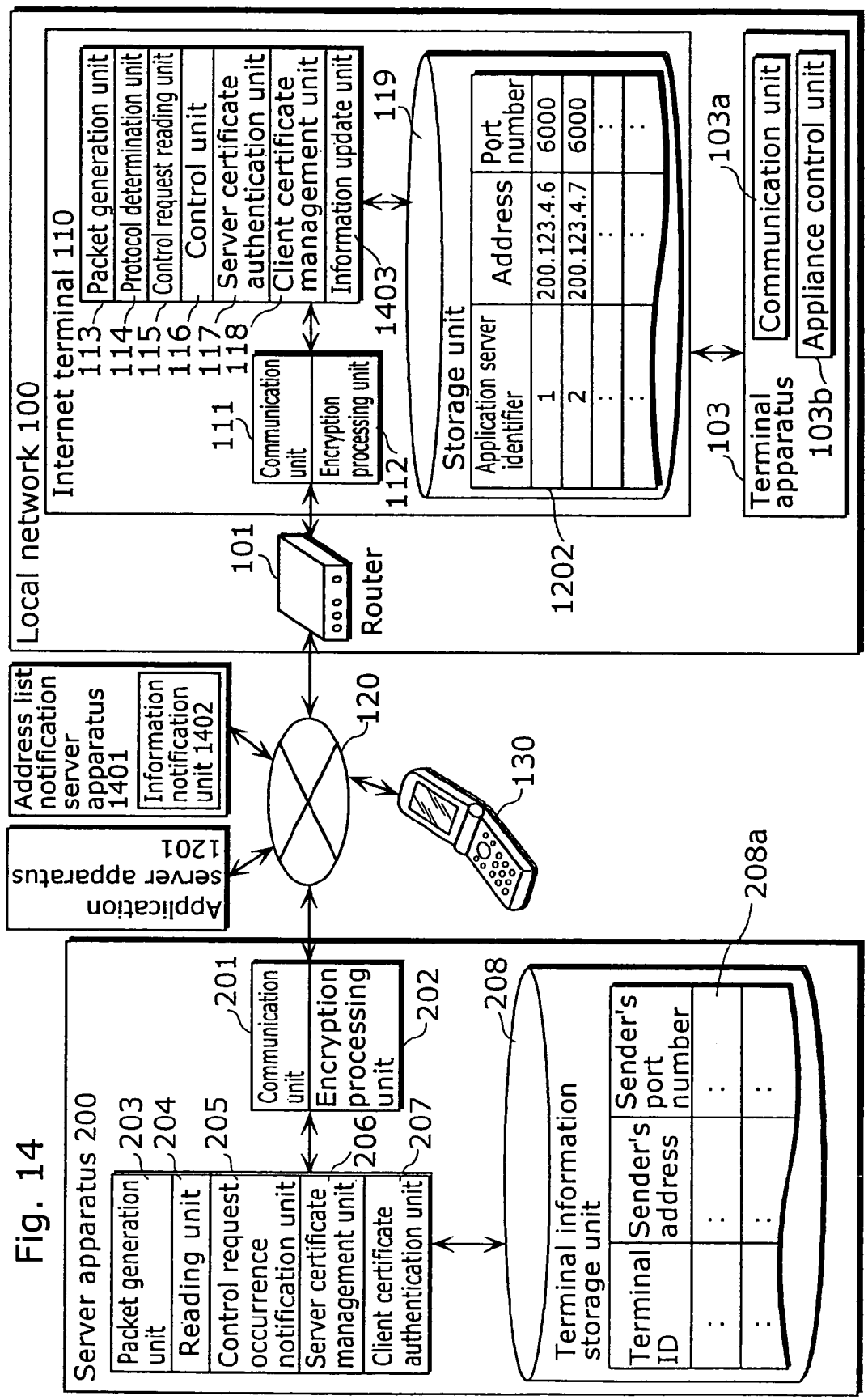
FIG. 14 is an example functional block diagram showing the server apparatus, the internet terminal, the terminal apparatus, an application server apparatus, and an address list notification server apparatus according to the third embodiment.

FIG. 14 is an example functional block diagram showing the server apparatus 200, the internet terminal 110, the terminal apparatus 103, the application server apparatus 1201, and the address list notification server apparatus 1401 according to the third embodiment.

In FIG. 14, the address list notification server apparatus 1401 for notifying the internet terminal 110 of a set of application server identifier/address information, is newly added to the configuration illustrated in FIG. 12. Note that, in FIG. 14, the same constituent elements as those illustrated in FIG. 12 are assigned with the same numbers, and detailed explanations thereof are omitted.

The address list notification server apparatus 1401 has an information notification unit 1402 that sends a set of application server identifier/address information to the internet terminal 110.

The internet terminal 110 according to the third embodiment includes an information update unit 1403 that receives a new set of application server identifier/address information from the address list notification server apparatus 1401, and updates the application server identifier/address information stored in the table 1202 of the storage unit 119.

Next, an explanation is given of the procedure of updating the application server identifier/address information. The information update unit 1403 of the internet terminal 110 prepares/updates the application server identifier/address information stored in the table 1202 of the storage unit 119 when receiving a new set of application server identifier/address information from the address list notification server apparatus 1401, or when receiving a new set of application server identifier/address information as a response to a request which it has made to the address list notification server apparatus 1401.

As explained above, in the communication system according to the third embodiment, since the storage unit 119 in the internet terminal 110 always stores updated application server identifier and the address and port number of the application server apparatus, it is possible to identify an application server apparatus most currently involved. Furthermore, it is easy to support a change in the address of the application server apparatus.

Note that it is also conceivable that the URL of the application server apparatus 1201 is stored in the table 1202 of the storage unit 119 in the internet terminal 110, instead of the address and port number of the application server apparatus 1201. FIG. 15 shows an example of such set of application server identifier/address information 1500.

The communication unit 111 extracts, from the application server identifier/address information 1500 stored in the table 1202 of the storage unit 119, a URL that corresponds to the application server identifier 1309 included in the data part 1302 of the control request occurrence notification local packet 1300, and extracts the address and port number of the corresponding application server apparatus, using a predetermined method. DNS (Domain Name System) is an example method of extracting such address and port number. Subsequently, the communication unit 111 requests, via the router 101, the application server apparatus 1201 that corresponds to the above-extracted address and port number to establish a TCP connection. Accordingly, it becomes possible for the communication unit 111 to receive a control request under TCP.

Note that a mobile phone is used as the mobile terminal device 130 to explain the preferred embodiments, but the present invention is not limited to this, and therefore that an equivalent functionality can be achieved by using other terminal devices/apparatuses including PC and PDA which can be connected to the internet network 120.

INDUSTRIAL APPLICABILITY

The home terminal apparatus according to the present invention is suited to be used as a terminal apparatus at home for sending and receiving packet data to and from a router connected to an external network, by being connected to such router via a home network, and more particularly, the home terminal apparatus according to the present invention is applicable to a terminal apparatus for remotely operating home appliances in an integrated manner as well as applicable to home appliances and the like such as an air conditioner.

The invention claimed is:

1. A home terminal apparatus connected to a router via a home network and for sending/receiving packet data to and from the router connected to an external network to which a server apparatus is connected, said home terminal apparatus comprising:

a packet generation unit operable to generate packet data to be sent to the server apparatus via the router;

a protocol determination unit operable to determine a communication protocol used between said home terminal apparatus and the server apparatus; and a communication unit operable to send/receive the packet data to and from the server apparatus via the router, wherein said protocol determination unit is operable to determine that said home terminal apparatus is to communicate with the server apparatus using (i) a first communication protocol, being a User Datagram Protocol (UDP), when said communication unit sends address notification packet data generated by said packet generation unit to the server apparatus periodically and repeatedly at a predetermined sending interval via the router, and (ii) a second communication protocol, being a Transmission Control Protocol (TCP), when said communication unit sends/receives control information to and from the server apparatus, wherein when said communication unit receives, from the server apparatus, a notification packet indicating an occurrence of a control request to control said home terminal apparatus while said communication unit is repeating the sending, using the UDP, of the address notification packet on a periodical basis:

said packet generation unit is operable to generate a connection request packet, which is a packet for making a connection request to establish a TCP connection to the server apparatus;

said protocol determination unit is operable to determine that the connection request packet is to be communicated using the second communication protocol which is the TCP; and said communication unit is operable to send the connection request packet to the server apparatus using the TCP, and operable to receive, from the server apparatus, control packet data, which is data including the control request in the TCP after the connection is established between the server apparatus and said home terminal apparatus using the second communication protocol which is the TCP.

2. The home terminal apparatus according to claim 1 further comprising a management unit operable to manage a certificate, which is a certificate for verifying validity of said home terminal apparatus, wherein said communication unit is operable to send, to the server apparatus, the certificate managed by said management unit, after receiving the notification packet.

3. The home terminal apparatus according to claim 1 wherein:

said packet generation unit is operable to generate an inquiry packet, which is a packet for inquiring the server apparatus about the control request, when the connection is established to the server apparatus using the second communication protocol; and said communication unit is operable to send the inquiry packet to the server apparatus via the router.

4. The home terminal apparatus according to claim 1, further comprising an authentication unit operable to authenticate the server apparatus as a communication partner using a server certificate, which is a certificate for verifying validity of the server apparatus as the communication partner.

5. The home terminal apparatus according to claim 4, wherein said authentication unit is operable to authenticate the validity of the server apparatus as the communication partner using an IP address of the server apparatus and/or terminal ID information unique to said home terminal apparatus, which is information included in the packet data received by said communication unit.

6. The home terminal apparatus according to claim 4, wherein said authentication unit is operable to destroy the packet data, when said communication unit receives the packet data within a predetermined interval.

7. The home terminal apparatus according to claim 1, further comprising an encryption unit operable to encrypt data in a channel between said home terminal apparatus and the server apparatus that uses the second communication protocol, when the control information is sent/received to and from the server apparatus.

8. The home terminal apparatus according to claim 7, wherein said encryption unit uses SSL to encrypt the data in the channel.

9. The home terminal apparatus according to claim 1, further comprising a control unit operable to control said home terminal apparatus according to the control information.

10. The home terminal apparatus according to claim 9, wherein:

a plurality of terminal apparatuses are connected to said home terminal apparatus via the home network;

each of the terminal apparatuses includes an apparatus control unit operable to control each terminal apparatus, respectively;

said communication unit is operable to send the control information to each of the terminal apparatuses; and each of the apparatus control units is operable to control each of the terminal apparatuses, respectively, according to the control information.

11. The home terminal apparatus according to claim 1, wherein the server apparatus includes:

a second communication unit operable to send/receive packet data to and from said home terminal apparatus via the router; and a second packet generation unit operable to generate the packet data to be sent to said home terminal apparatus, wherein the second packet generation unit is operable to generate a notification packet indicating an occurrence of a control request to control said home terminal apparatus, when the control request occurs in the server apparatus, and wherein the second communication unit is operable to send the notification packet to said home terminal apparatus via the router.

12. The home terminal apparatus according to claim 11, wherein:

a mobile terminal device is connected to the external network, the mobile terminal device being operable to send the control request to control said home terminal apparatus; and the second packet generation unit is operable to generate the notification packet when the second communication unit receives the control request from the mobile terminal device.

13. The home terminal apparatus according to claim 11, wherein:

the second packet generation unit is operable to generate the control packet data including the control request; and the second communication unit is operable to send the control packet data to said home terminal apparatus via the router, after the connection is established between said home terminal apparatus and the server apparatus using the second communication protocol.

14. The home terminal apparatus according to claim 13, wherein the second communication unit is operable to send the control packet data to said home terminal apparatus via the router, only when the control request occurs in the server apparatus.

15. The home terminal apparatus according to claim 13, wherein the second communication unit is operable to send the control packet data to said home terminal apparatus via the router, only when receiving, from said home terminal apparatus, an inquiry packet for inquiring about the control request.

16. The home terminal apparatus according to claim 11, wherein:

the server apparatus further includes:

a terminal information storage unit operable to store, as terminal information, a terminal ID of said home terminal apparatus, a global address of the router which is an address of a sender, and a global port number of the router which is a port number of the sender, which is information included in the packet data received by the second communication unit; and an extraction unit operable to extract, from the terminal information storage unit, the global address and the global port number which correspond to the terminal ID, when the control request to control said home terminal apparatus with the terminal ID occurs in the server apparatus; and the second packet generation unit is operable to generate the notification packet that includes notification information, the notification information being information indicating the occurrence of the control request, and the notification packet including, respectively as a destination address and a destination port number, the global address and the global port number extracted by the extraction unit.

17. The home terminal apparatus according to claim 11, wherein:

the server apparatus further includes a second management unit operable to manage a server certificate, which is a certificate for verifying validity of the server apparatus; and the second communication unit is operable to send, to said home terminal apparatus, the server certificate managed by the second management unit, after receiving, from said home terminal apparatus, the connection request packet, which is a packet for requesting a connection to the server apparatus using the second communication protocol.

18. The home terminal apparatus according to claim 11, wherein the server apparatus further includes a second authentication unit operable to authenticate said home terminal apparatus as a communication partner using a certificate, which is a certificate for verifying validity of said home terminal apparatus as the communication partner.

19. The home terminal apparatus according to claim 11, wherein the server apparatus further includes a second encryption unit operable to encrypt data in a channel between said home terminal apparatus and the server apparatus that uses the second communication protocol when the control information is sent/received to and from said home terminal apparatus.

20. The home terminal apparatus according to claim 11, wherein:

an application server is connected to the external network;

the second packet generation unit of the server apparatus is operable to generate the notification packet indicating the occurrence of the control request, the notification packet including an application server identifier for identifying the application server;

the second communication unit is operable to send the notification packet to said home terminal apparatus via the router;

said home terminal apparatus further comprises:

a storage unit operable to store application server identifier/address information including at least the application server identifier and an address of the application server; and an extraction unit operable to extract, from the application server identifier/address information stored by said storage unit, the address of the application server that corresponds to the application server identifier included in the notification packet, when said communication unit receives the notification packet from the router; and said packet generation unit is operable to generate the connection request packet, which is a packet that describes the address of the application server as a destination address.

21. The home terminal apparatus according to claim 20, wherein:

said storage unit is operable to store a port number of the application server to the application server identifier/address information;

said extraction unit is operable to extract, from the application server identifier/address information stored by said storage unit, the address of the application server and the port number of the application server that correspond to the application server identifier included in the notification packet, when said communication unit receives the notification packet from the router;

said packet generation unit is operable to generate the connection request packet that describes the address of the application server as the destination address and the port number of the application server as a destination port number; and said communication unit is operable to send the connection request packet to the server apparatus via the router.

22. The home terminal apparatus according to claim 20, wherein:

said storage unit is operable to store the application server identifier/address information that includes the application server identifier and a URL of the application server;

said extraction unit is operable to extract, from the application server identifier/address information stored by said storage unit, the URL of the application server that corresponds to the application server identifier included in the notification packet, when said communication unit receives the notification packet from the router; and said communication unit is operable to send the connection request packet to the URL.

23. The home terminal apparatus according to claim 22, wherein:

an address list notification server is connected to the external network;

the address list notification server includes a sending unit operable to send, to said home terminal apparatus, an address list notification packet, which is a packet including another application server identifier/address information via the router; and said home terminal apparatus further comprises an update unit operable to update the application server identifier/address information stored by said storage unit, on the basis of the another application server identifier/address information included in the received address list notification packet from the router.

24. The home terminal apparatus according to claim 1, wherein the router is directly connected to the external network, not via an internet service provider.

25. A communication system comprising:

a server apparatus connected to an external network;

a home terminal apparatus connected to a home network; and a router which connects the external network and the home network, wherein:

said home terminal apparatus includes:

a packet generation unit operable to generate packet data to be sent to said server apparatus via said router;

a protocol determination unit operable to determine a communication protocol used between said home terminal apparatus and said server apparatus; and a communication unit operable to send/receive the packet data to and from said server apparatus via said router;

said server apparatus includes:

a second communication unit operable to send/receive packet data; and a second packet generation unit operable to generate the packet data to be sent to said home terminal apparatus; and said protocol determination unit is operable to determine that said home terminal apparatus is to communicate with said server apparatus using (i) a first communication protocol, being a User Datagram Protocol (UDP), when said communication unit sends address notification packet data generated by said packet generation unit to said server apparatus periodically and repeatedly at a predetermined sending interval via said router, and (ii) a second communication protocol, being a Transmission Control Protocol (TCP), when said communication unit sends/receives control information to and from said server apparatus, wherein:

said second packet generation unit of said server apparatus is operable to generate a notification packet indicating an occurrence of a control request to control said home terminal apparatus, when the control request occurs in said server apparatus;

said second communication unit is operable to send the notification packet to said home terminal apparatus via said router;

when said communication unit of said home terminal apparatus receives the notification packet from said server apparatus while said communication unit is repeating the sending, using the UDP, of the address notification packet data on a periodical basis, said packet generation unit is operable to generate a connection request packet for making a connection request, which is a request to establish a TCP connection to said server apparatus, and said protocol determination unit is operable to determine that the connection request packet is to be communicated using the second communication protocol which is the TCP; and said communication unit is operable to send the connection request packet to the server apparatus using the TCP, and operable to receive, from said server apparatus, control packet data, which is data including the control request in the TCP after the connection is established between said server apparatus and said home terminal apparatus using the second communication protocol which is the TCP.

26. A communication method in which an external network to which a server apparatus is connected and a home network to which a home terminal apparatus is connected are connected via a router, said communication method comprising home terminal apparatus steps executed by the home terminal apparatus and server apparatus steps executed by the server apparatus, wherein the home terminal apparatus steps include:

generating packet data to be sent to the server apparatus via the router;

determining a communication protocol used between the home terminal apparatus and the server apparatus; and sending/receiving the packet data to and from the server apparatus via the router, wherein the server apparatus steps include:

sending/receiving packet data to and from the home terminal apparatus via the router; and generating the packet data to be sent to the home terminal apparatus, wherein, said determining of the communication protocol includes determining that the home terminal apparatus is to communicate with the server apparatus using (i) a first communication protocol, being a User Datagram Protocol (UDP), when address notification packet data, which is packet data generated in said generating of the packet data executed by the home terminal apparatus, is sent to the server apparatus periodically and repeatedly at a predetermined sending interval via the router in said sending/receiving of the packet data executed by the home terminal apparatus, and (ii) a second communication protocol, being a Transmission Control Protocol (TCP), when control information is sent/received to and from the server apparatus in said sending/receiving of the packet data executed by the home terminal apparatus, and wherein the home terminal apparatus steps further include, when the home terminal apparatus receives, from the server apparatus, a notification packet indicating an occurrence of a control request to control the home terminal apparatus while the home terminal apparatus is repeating the sending, using the UDP, of the address notification packet data on a periodical basis:

generating a connection request packet, which is a packet for making a connection request to establish a TCP connection to the server apparatus;

determining that the connection request packet is to be communicated using the second communication protocol which is the TCP;

sending the connection request packet to the server apparatus using the TCP; and receiving, from the server apparatus, control packet data, which is data including the control request in the TCP after the connection is established between the server apparatus and the home terminal apparatus using the second communication protocol which is the TCP.

27. A program stored on a computer-readable storage medium for causing a home terminal apparatus connected to a router via a home network to send/receive packet data to and from the router connected to an external network to which a server apparatus is connected, said program causing an execution of home terminal apparatus steps by the home terminal apparatus and an execution of server apparatus steps by the server apparatus, wherein:

the home terminal apparatus steps include:

generating packet data to be sent to the server apparatus via the router;

determining a communication protocol used between the home terminal apparatus and the server apparatus; and sending/receiving the packet data to and from the server apparatus via the router; and said determining of the communication protocol includes determining that the home terminal apparatus is to communicate with the server apparatus using (i) a first communication protocol, being a User Datagram Protocol (UDP), when address notification packet data, which is packet data generated in said generating of the packet data, is sent to the server apparatus periodically and repeatedly at a predetermined sending interval via the router in said sending/receiving of the packet data, and (ii) a second communication protocol, being a Transmission Control Protocol (TCP), when control information is sent/received to and from the server apparatus in said sending/receiving of the packet data, and wherein the home terminal apparatus steps further include, when the home terminal apparatus receives, from the server apparatus, a notification packet indicating an occurrence of a control request to control the home terminal apparatus while the home terminal apparatus is repeating the sending, using the UDP, of the address notification packet data on a periodical basis:

generating a connection request packet, which is a packet for making a connection request to establish a TCP connection to the server apparatus;

determining that the connection request packet is to be communicated using the second communication protocol which is the TCP;

sending the connection request packet to the server apparatus using the TCP; and receiving, from the server apparatus, control packet data, which is data including the control request in the TCP after the connection is established between the server apparatus and the home terminal apparatus using the second communication protocol which is the TCP.

28. The program according to claim 27, wherein the server apparatus steps include:

sending/receiving packet data to and from the home terminal apparatus via the router;

generating the packet data to be sent to the home terminal apparatus; and generating a notification packet indicating an occurrence of a control request to control the home terminal apparatus when the control request occurs in the server apparatus and sending the notification packet to the home terminal apparatus via the router.

29. The home terminal apparatus according to claim 1, wherein the periodical basis is a cycle that is shorter than a period that a conversion table containing addresses is held by the router.

* * * * *